(12) United States Patent
Tanaka et al.

(10) Patent No.: US 6,836,729 B2
(45) Date of Patent: Dec. 28, 2004

(54) METHOD OF AND APPARATUS FOR DETECTING VEHICLE SPEED PULSE DROP, ON-VEHICLE NAVIGATION SYSTEM, PROGRAM STORAGE DEVICE AND COMPUTER DATA SIGNAL EMBODIED IN CARRIER WAVE

(75) Inventors: Kazuaki Tanaka, Saitama-ken (JP); Seiji Goto, Saitama-ken (JP); Tatsuya Okamoto, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 167 days.

(21) Appl. No.: 10/137,670

(22) Filed: May 3, 2002

(65) Prior Publication Data

US 2002/0198658 A1 Dec. 26, 2002

(30) Foreign Application Priority Data

May 7, 2001 (JP) ...................................... 2001-136515

(51) Int. Cl.$^7$ ............................................. G01C 21/00
(52) U.S. Cl. ........................ 701/216; 701/79; 701/121; 702/96; 702/150; 340/993
(58) Field of Search ................................. 701/216, 200, 701/220, 225, 117, 79, 93, 110, 121; 340/988, 993; 702/150, 94, 96

(56) References Cited

U.S. PATENT DOCUMENTS 5,657,232 A * 8/1997 Ishikawa et al. ............ 701/215
5,796,613 A * 8/1998 Kato et al. .................. 701/214
5,828,585 A 10/1998 Welk et al. ............. 364/571.01
6,087,965 A 7/2000 Murphy ....................... 350/991
6,603,865 B1 * 8/2003 Yagi et al. ................... 382/103

FOREIGN PATENT DOCUMENTS

| JP | 9-297030 | 11/1997 |
|---|---|---|
| JP | 10019585 | 1/1998 |
| JP | 10-115627 | 5/1998 |
| JP | 10-300509 | 11/1998 |
| JP | 10-307036 | 11/1998 |
| JP | 2000-97713 | 4/2000 |

* cited by examiner

Primary Examiner—Thomas G. Black
Assistant Examiner—Arthur D. Donnelly
(74) Attorney, Agent, or Firm—Morgan, Lewis & Bockius LLP

(57) ABSTRACT

An on-vehicle navigation system is provided with a radio wave positioning apparatus (18) and a vehicle speed sensor (13) for a dead reckoning positioning. A method of detecting a vehicle speed pulse drop of a vehicle speed pulse generated by the vehicle speed sensor is provided with: a first calculation process of calculating a first physical quantity of a predetermined type such as a velocity or the like from radio wave positioning data of the radio wave positioning apparatus; a second calculation process of calculating a second physical quantity of the same type as the first physical quantity from the vehicle speed pulse; and a detection process of detecting the vehicle speed pulse drop by using a contradiction caused between the calculated first physical quantity and the calculated second physical quantity as a detection condition.

29 Claims, 12 Drawing Sheets

METHOD OF AND APPARATUS FOR DETECTING VEHICLE SPEED PULSE DROP, ON-VEHICLE NAVIGATION SYSTEM, PROGRAM STORAGE DEVICE AND COMPUTER DATA SIGNAL EMBODIED IN CARRIER WAVE

BACKGROUND OF THE INVENTION

1. Field of the Invention

The present invention generally relates to a method of and an apparatus for detecting a vehicle speed pulse drop in an on-vehicle navigation system in which a current position etc. of a vehicle is displayed by using (i) a dead reckoning positioning system (i.e., a self-sustained or built-in positioning system), which is a system for measuring the current position on the basis of an output from dead reckoning positioning sensors including a vehicle speed sensor, and/or (ii) a radio wave positioning system such as a GPS (Global Positioning System), which is a system for positioning or measuring the current position on the basis of "positioning radio waves (which are radio waves or electric waves for positioning the present position)" from satellites for the radio wave positioning or measurement such as GPS satellites etc. The present invention also relates to an on-vehicle navigation system including the above-mentioned detecting apparatus, as well as a program storage device and a computer data signal embodiment in a carrier wave, which allow a computer to function as the above-mentioned detecting apparatus.

2. Description of the Related Art

Currently, there are (i) the dead reckoning positioning or measuring system and (i) the GPS, as rough categories of a system for positioning or measuring the present position of a vehicle in an on-vehicle navigation system.

The dead reckoning positioning system is intended to calculate a current position with respect to a standard position, on the basis of a moving direction, a distance and the like of a movable body obtained by dead reckoning positioning sensors such as a vehicle speed sensor, an angular velocity sensor, an acceleration sensor and the like which are equipped in the movable body. Especially, the vehicle speed sensor, among the dead reckoning positioning sensors, is intended to generate a vehicle speed pulse in response to a rotation of a vehicle shaft after detecting the rotation and is constructed to calculate a drive distance and a velocity from the cumulative number and the number per unit time of the generated vehicle speed pulse respectively.

Recently, as disclosed in Japanese Patent Application Laying Open NO. Hei 10-300509 and Japanese Patent Application Laying Open NO. Hei 10-115627 etc., for example, there has been developed a vehicle speed sensor of a magnetic field detection type, which detects a change of a magnetic field emitted from a generation source of the vehicle speed pulse additionally attached to a tire or at the vicinity thereof, or emitted from a steel belt included in the tire, to thereby generate the vehicle speed pulse. According to this type of sensor, it is possible to generate the vehicle speed pulse relatively easily in an arbitrary type of vehicle including a foreign vehicle or the like which has no generation source of the vehicle speed pulse or is uncertain about its presence.

On the other hand, the GPS is intended to receive with GPS receivers the positioning radio waves from a plurality of GPS satellites launched into the outer space and to calculate a current position and a moving velocity of a movable body by a 3D (3-dimensional) measurement or a 2D (2-dimensional) measurement based on the reception results.

Recently, as disclosed in Japanese Patent Application Laying Open NO. Hei 09-297030 and Japanese Patent Application Laying Open NO. Hei 10-307036, for example, a navigation system, which performs both of the above described dead reckoning positioning measurement and the above described GPS measurement, has been also developed. This navigation system mainly uses the dead reckoning positioning measurement or compensates the GPS measurement with the dead reckoning positioning measurement in the case that the GPS measurement is not available or cannot attain an enough accuracy, for example. On the other hand, in the case that the GPS measurement is available or can attain an accuracy as usual, the navigation system mainly uses the GPS measurement and compensates the GPS measurement with the dead reckoning positioning measurement.

However, especially as to the vehicle speed sensor which plays a key role in the dead reckoning positioning system as described above, such a situation may occur that the "vehicle speed pulse" is not generated when "the vehicle speed pulse" as a vehicle speed signal is supposed to be outputted from the vehicle speed sensor while the vehicle is actually driving,which is a problem (this situation is referred to as a "vehicle speed pulse drop"). There may be considered various causes and reasons of this vehicle speed pulse drop individually and concretely, e.g., it is difficult to produce (i) the vehicle speed sensor with a constant sensitivity and (ii) the generation source of the vehicle speed pulse with a constant output, over the whole vehicle speed, an electrical noise is generated on a line or wire through which the vehicle speed pulse is transmitted, and a sensor error is generated due to an unexpected vibration in driving.

Especially, as to the vehicle speed sensor which detects the change of the magnetic field to generate the vehicle speed pulse as mentioned above, there is a significant problem that the vehicle speed pulse drop may occur frequently depending on the driving condition because the magnetic field detected by the sensor may drastically change as much as it cannot be ignored on the detection accuracy depending on a strain of the tire, a suspension operation and so on.

When the vehicle speed pulse drop occurs, an error occurs such that the vehicle speed is drifted to its lower side to deteriorate the accuracy of the vehicle speed, and another error occurs such that the moving distance is drifted to its shorter side to deteriorate the accuracy of the moving distance based on the dead reckoning positioning system. Moreover, in addition to deteriorating the accuracy of the current position based on the dead reckoning positioning system, there is a problem that the vehicle speed pulse drop deteriorates the accuracy of the current position etc., which is finally obtained after the correction or compensation based on the dead reckoning positioning measurement with respect to the GPS measurement.

For this problem, Japanese Patent Application Laying Open NO. 2000-97713 discloses a system for calculating the moving distance and the current position with a high accuracy based on the vehicle speed pulse even in the case that the vehicle speed pulse drop is generated while driving at a low speed. However, a detection method of the vehicle speed pulse drop in this system is extremely simple. For example, in this system, the vehicle speed pulse drop is detected by a change from a condition of "the number of the vehicle speed pulse>1" to a condition of "the number of the vehicle speed pulse=0" under monitoring the vehicle speed pulse with a constant time interval. Therefore, it is hard to say that the detection accuracy of the vehicle speed pulse drop is substantially high.

SUMMARY OF THE INVENTION

It is therefore an object of the present invention to provide a method of and an apparatus for detecting a vehicle speed pulse drop, in which the detection of the vehicle speed pulse drop can be performed with a high accuracy, an on-vehicle navigation system including the above mentioned detecting apparatus, as well as a program storage device and a computer data signal embodiment in a carrier wave, which allow a computer to function as the detecting apparatus.

The above object of the present invention can be achieved by a first method of detecting a vehicle speed pulse drop of a vehicle speed pulse in an on-vehicle navigation system, the system provided with a radio wave positioning apparatus and a vehicle speed sensor, by which the vehicle speed pulse is generated, for a dead reckoning positioning, the method provided with: a first calculation process of calculating a first physical quantity of a predetermined type from radio wave positioning data of the radio wave positioning apparatus; a second calculation process of calculating a second physical quantity of the predetermined type from the vehicle speed pulse; and a detection process of detecting the vehicle speed pulse drop by using a contradiction caused between the calculated first physical quantity and the calculated second physical quantity as a detection condition.

According to the first method of the present invention, the first calculation process calculates the first physical quantity of a predetermined type such as a velocity of a vehicle by using, for example, a frequency change caused by Doppler effect from the radio wave positioning data of the radio wave positioning apparatus such as a GPS receiver or the like. Along with this, the second calculation process calculates the second physical quantity of the same type as what is calculated in the first calculation process, e.g. a velocity, which is in proportion to the number of the vehicle speed pulse per unit time, of a vehicle, in which the on-vehicle navigation system is equipped, from the vehicle speed pulse such as the one from a vehicle speed sensor or the like. Then, the detection process detects the vehicle speed pulse drop by using a contradiction caused between the calculated first physical quantity and the calculated second physical quantity; for example, such a contradiction that there is an enormous difference between the calculated two kinds of velocities of the vehicle, as a detection condition. Namely, it is possible to detect the vehicle speed pulse drop when the velocity based on the vehicle speed pulse decreases so rapidly that it cannot be decelerated in a real world on the basis of vehicle weight, an ability of brake control or the like, or when the velocity based on the vehicle speed pulse decreases extremely as compared to the velocity based on the radio wave positioning data. Therefore, by using the radio wave positioning data with such a positioning accuracy that generally has no causal relationship with how easily the vehicle speed pulse drop occurs, it is possible to detect the vehicle speed pulse drop with a relatively high reliability. Thus, when the vehicle speed pulse drop occurs, it becomes possible to correct the vehicle speed pulse including an error of the vehicle speed sensor, or to eliminate a use of the vehicle speed pulse including the error for displaying a current position with the on-vehicle navigation system. For example, when the vehicle speed pulse drop is detected, it becomes possible to use the radio wave positioning data for navigation exclusively and temporarily, or to interpolate and predict a missing vehicle speed pulse by using the vehicle speed pulse in the past or the future when the vehicle speed pulse drop was not or will be not detected.

In one aspect of the first method, the first calculation process calculates a velocity as the first physical quantity, the second calculation process calculates a velocity as the second physical quantity, and the detection process uses such a condition that a difference between the velocity calculated by the first calculation process and the velocity calculated by the second calculation process is more than a predetermined threshold value as one detection condition for the vehicle speed pulse drop.

According to this aspect, the first calculation process calculates the velocity as the first physical quantity based on a positioning radio wave, and the second calculation process calculates the velocity as the second physical quantity based on the vehicle speed pulse, and the detection process detects the vehicle speed pulse drop by using such a condition that a difference between these velocities is more than the predetermined threshold value. For example, when the velocity calculated in the first calculation process is regarded as V1, the velocity calculated in the second calculation process as V2, and the threshold value as Vth, it is monitored whether or not a velocity difference V1−V2>Vth. If this equation holds true, it is judged as the vehicle speed pulse drop. Therefore, it is possible to detect the vehicle speed pulse drop with a high reliability by a relatively simple process of monitoring inequality between the velocity difference and the threshold value.

Incidentally, in this aspect, it is possible to detect the vehicle speed pulse drop by comparing a velocity ratio V1/V2 with another threshold value Vth' (i.e. a detection condition: V1/V2>Vth') in the detection process.

In this aspect of the first method, the method may be further provided with a third calculation process of calculating a velocity change amount from the radio wave positioning data and a fourth calculation process of calculating a velocity change amount from the vehicle speed pulse, wherein the detection process uses such a condition that the velocity change amount calculated by the third calculation process is less than a predetermined threshold value and the velocity change amount calculated by the fourth calculation process is more than a predetermined threshold value as another detection condition for the vehicle speed pulse drop.

By constituting in this manner, the vehicle speed pulse drop is detected by using such a condition that the velocity change amount calculated by the third calculation process is less than the predetermined threshold value and the velocity change amount calculated by the fourth calculation process is more than the predetermined threshold value as a detection condition in addition to the condition that the above mentioned velocity difference is more than the predetermined threshold value. In other words, the vehicle speed pulse drop is detected by using such a condition that, although the vehicle speed based on the radio wave positioning with a positioning accuracy, which generally has no causal relationship with how easily the vehicle speed pulse drop occurs, does not change substantially, the vehicle velocity based on the vehicle speed pulse changes relatively largely. In this manner, by using the fact that the velocity change of a vehicle is to some degree within a limited range, it is possible to detect the vehicle speed pulse drop with a very high accuracy, except extremely special cases such as a traffic accident etc.

The above object of the present invention can be achieved by a second method of detecting a vehicle speed pulse drop of a vehicle speed pulse in an on-vehicle navigation system, the system provided with a vehicle speed sensor, by which the vehicle speed pulse is generated, for a dead reckoning positioning, the method provided with: a measurement process of measuring a pulse interval between the vehicle speed pulses generated by the vehicle speed sensor, a first hold process of at least temporarily holding a pulse interval measured for the n-th time (n is a natural number) by the measurement process; and a detection process of detecting the vehicle speed pulse drop by using such a condition that a ratio of a pulse interval measured for the (n+m)-th time (m is a natural number) with respect to the pulse interval held by the first hold process is more than a predetermined threshold value as a detection condition.

According to the second method of the present invention, the measurement process measures the interval of the vehicle speed pulse. Then, the first hold process holds a pulse interval measured for the n-th time at least temporarily. For example, a buffer holds data, which show the pulse interval, every measurement. Then, the detection process detects the vehicle speed pulse drop by using such a condition that a ratio of a pulse interval measured for the (n+m)-th time with respect to the held pulse interval is more than a predetermined threshold value. For example, when the pulse interval held by the first hold process is regarded as $W(n)$ and the pulse interval measured for the (n+m)-th time as $W(n+1)$ and the threshold value as Wth, it is judged whether or not $W(n+1)/W(n) > Wth$ every measurement or every time the vehicle speed pulse is generated. When this equation holds true, it is judged as the vehicle speed pulse drop. Therefore, as compared with the above mentioned first method of detecting the vehicle speed pulse drop, it is possible to detect the vehicle speed pulse drop by using the vehicle speed pulse exclusively without any radio wave positioning data such as GPS measurement data or the like. Thus, there is no use of the velocity averaged over a predetermined time duration, for example, 1/10, 1, or 2 sec, as in the case of the GPS measurement. Consequently, the detection accuracy in the detection of the vehicle speed pulse drop can be certainly more improved than the one of the first method in a situation that the accuracy of the GPS measurement is low, for example. It is also possible to detect the vehicle speed pulse drop with a high reliability in correspondence to such a generally low possibility that the vehicle speed pulse drop is continued to generate over a long period as long as a generation source of the vehicle speed pulse and the vehicle speed pulse operate properly.

Incidentally, in the second method, the detection process may detect the vehicle speed pulse drop by comparing a difference $\Delta W$ between the pulse interval $W(n)$ held by the first hold process and the pulse interval $W(n+1)$ measured for the (n+m)-th time with another threshold value Wth' (i.e. by using $\Delta W = W(n+1) - W(n) > Wth'$ as a detection condition).

In one aspect of the second method of the present invention, the method is further provided with a second hold process of at least temporarily holding the pulse interval measured for the (n+m)-th time, wherein the detection process uses such a condition that a ratio of the pulse interval held by the second hold process with respect to the pulse interval held by the first hold process is more than the predetermined threshold value as a detection condition.

According to this aspect, because such a condition that a ratio of the pulse interval held by the second hold process with respect to the pulse interval held by the first hold process is more than the predetermined threshold value is used as a detection condition, it is possible to detect the vehicle speed pulse drop relatively certainly.

In another aspect of the second method of the present invention, the predetermined threshold value is a variable value or a fixed value which is set in advance.

According to this aspect, as the predetermined threshold value, for example, the fixed value, which is set depending on a vehicle specification such as its weight, its engine ability, its brake control ability etc., may be used. Therefore, in the detection process, it is possible to detect the vehicle speed pulse drop by a simple comparison process such as a comparison of the fixed threshold value.

Moreover, as the predetermined threshold value, a variable value, which is variable depending on a velocity, may be used.

The above object of the present invention can be achieved by a third method of detecting a vehicle speed pulse drop of a vehicle speed pulse in an on-vehicle navigation system, the system provided with a vehicle speed sensor, by which the vehicle speed pulse is generated, for a dead reckoning positioning, the method provided with: a measurement process of measuring a pulse interval between the vehicle speed pulses generated by the vehicle speed sensor; a prediction process of predicting a generation time of the vehicle speed pulse, which is generated by the vehicle speed sensor and which defines an end of the pulse interval supposed to be measured for the (n+m)-th time (n and m are both natural numbers) by the measurement process, from the pulse interval measured for the n-th time by the measurement process; and a detection process of detecting the vehicle speed pulse drop, by using such a condition that the vehicle speed pulse is not generated by the vehicle speed pulse sensor even after it has elapsed the predicted generation time.

According to the third method of the present invention, the measurement process measures the pulse interval between vehicle speed pulses generated by the vehicle speed sensor. The prediction process predicts (calculates or estimates by calculating) the generation time of the vehicle speed pulse, which defines an end of the vehicle speed pulse interval to be measured for the (n+m)-th time, from the pulse interval measured for the n-th time. For example, when the pulse interval measured for the n-th time is regarded as $W(n)$ and the pulse interval to be measured for the (n+m)-th time as $W(n+1)$, in consideration of acceleration and deceleration of a vehicle, the $W(n+1)$ is predicted by an expression such as $W(n) - \Delta w < W(n+1) < W(n) + \Delta w$ or $1 - \alpha < W(n+1)/W(n) < 1 + \alpha$ (wherein, $\Delta w$ and $\alpha$ are coefficients set in advance in consideration of acceleration and deceleration of a vehicle). Then, a generation time t1 of the vehicle speed pulse which defines an end of the predicted pulse interval $W(n+1)$ is predicted (calculated) from a generation time t0 of the vehicle speed pulse generated for the last time (i.e., the vehicle pulse which defines an end of the pulse interval measured for the n-th time) and the calculated pulse interval $W(n+1)$. Then, the detection process detects the vehicle speed pulse by such a condition that the vehicle speed pulse is not generated by the vehicle speed pulse sensor even after it has elapsed the predicted generation time t1, after comparing the current time with the predicted generation time t1 while monitoring a timer, for example. That is how to detect the vehicle speed pulse drop by using the vehicle speed pulse exclusively without any radio wave positioning data such as the GPS measurement data, as compared with the above mentioned the first method. Thus, there is no use of the velocity averaged over a predetermined time duration, for example, 1/10, 1, or 2 sec, as in the case of the GPS measurement. Consequently, the detection accuracy in the detection of the vehicle speed pulse drop can be certainly more improved than the one of the first method in a situation that the accuracy of the GPS measurement is low, for example. It is also possible to detect the vehicle speed pulse drop with a high reliability in correspondence to such a generally low possibility that the vehicle speed pulse drop is continued to generate over a long period as long as a generation source of the vehicle speed pulse. and the vehicle speed pulse operate properly.

In this case, the prediction process preferably predicts (calculates) the generation time with a certain width (period), and such a condition is preferably regarded as a detection condition that the vehicle speed pulse is not generated before the end point of the generation time (period).

In one aspect of the third method of the present invention, the method is further provided with a first hold process of at least temporarily holding the pulse interval measured for the n-th time, wherein the prediction process predicts the generation time from the pulse interval held by the first hold process.

According to this aspect, the generation time of the vehicle speed pulse which defines an end of the pulse interval to be measured for the (n+m)-th time is predicted (calculated) from the pulse interval measured for the n-th time which is held in a buffer or the like in the first hold process, so that it is possible to calculate the generation time relatively certainly and to detect the vehicle speed pulse on the basis of this prediction result.

In the prediction process, it is also possible to predict (calculate) the generation time of the vehicle speed pulse which defines an end of the (n+m)-th pulse interval from the pulse interval measured for the (n−1)-th time in addition to the pulse interval measured for the n-th time.

In another aspect of the third method, the prediction process predicts the (n+m)-th pulse interval instead of predicting the generation time, and the detection process uses such a condition that a pulse interval shorter than the predicted pulse interval is not measured by the measurement process as the detection condition instead of using the condition that the vehicle speed pulse is not generated even after it has elapsed the predicted generation time.

According to this aspect, the prediction process predicts (calculates) the (n+m)-th pulse interval. Then the detection process detects the vehicle speed pulse drop by using such a condition that a pulse interval shorter than the predicted (calculated) pulse interval is not measured by the measurement process. In this manner, it is also possible to detect the vehicle speed pulse drop in the substantially same way by comparing the pulse interval measured in the measurement process with the predicted (calculated) pulse interval.

In another aspect of the first method, the detection process detects an excess generation of the vehicle speed pulse by the vehicle speed sensor by using the contradiction as a detection condition.

According to this aspect, "the excess generation of the vehicle speed pulse", which is phenomenon of imbalance between rotational frequency of a tire and a moving distance of a vehicle against road surface caused by racing or idling tire against the road surface depending on engine revolution and road surface condition etc. even in generating the vehicle speed pulse normally with respect to the rotation of a tire and a vehicle shaft, can be detected according to the similar theory as that of detection of the vehicle speed pulse in the first method. In other words, the excess generation of the vehicle speed pulse can be detected when the velocity based on the vehicle speed pulse increases so extremely that it cannot be accelerated in a real world on the basis of vehicle weight, engine output or the like as compared with the velocity based on the radio wave positioning data. Therefore, it is possible to improve an accuracy of the moving distance and the velocity based on the dead reckoning positioning measurement by correcting the vehicle speed pulse including an error caused by the excess generation when the excess generation of the vehicle speed pulse is detected. Alternatively, by temporarily stopping a use of the vehicle speed pulse in the excess generation and instead, by using the radio wave positioning data exclusively, the accuracy of the moving distance and the velocity can be improved.

In another aspect of the second method, the detection process detects the excess generation of the vehicle speed pulse by the vehicle speed sensor by using such a condition that a ratio of the pulse interval measured for the (n+m)-th time by the measurement process with respect to the pulse interval held by the first hold process is less than another threshold value as a detection condition.

According to this aspect, the excess generation of the vehicle speed pulse can be detected according to the similar theory as that of detection of the vehicle speed pulse drop in the second method. Namely, the excess generation of the vehicle speed pulse can be detected when the velocity based on the vehicle speed pulse increases so rapidly that it cannot be accelerated in a real world on the basis of vehicle weight, engine output or the like.

In another aspect of the third method, the detection process detects the excess generation of the vehicle speed pulse by the vehicle speed sensor by using such a condition that the vehicle speed pulse is generated by the vehicle speed sensor before the predicted generation time as a detection condition.

According to this aspect, the excess generation of the vehicle speed pulse can be detected according to the similar theory as that of detection of the vehicle speed pulse drop in the third method. Namely, the excess generation of the vehicle speed pulse can be detected when the velocity based on the vehicle speed pulse increases so rapidly that it cannot be accelerated in a real world on the basis of vehicle weight, engine output or the like.

In this case, the prediction process may preferably predict (calculate) the generation time with a certain width (period) and such a condition may be regarded as a detection condition that the vehicle speed pulse is not generated before an initiation point of the predicted generation time (period).

The above object of the present invention can be achieved by a first apparatus for detecting a vehicle speed pulse drop of a vehicle speed pulse in an on-vehicle navigation system, the system provided with a radio wave positioning apparatus and a vehicle speed sensor, by which the vehicle speed pulse is generated, for a dead reckoning positioning, the apparatus provided with: a first calculation device for calculating a first physical quantity of a predetermined type from radio wave positioning data of the radio wave positioning apparatus; a second calculation device for calculating a second physical quantity of the predetermined type from the vehicle speed pulse; and a detection device for detecting the vehicle speed pulse drop by using a contradiction caused between the calculated first physical quantity and the calculated second physical quantity as a detection condition.

According to the first apparatus of the present invention, the first calculation device calculates the first physical quantity of a predetermined type such as a velocity of a vehicle by using, for example, a frequency change caused by Doppler effect from the radio wave positioning data of the radio wave positioning apparatus such as a GPS receiver or the like. Along with this, the second calculation device calculates the second physical quantity of the same type as what is calculated in the first calculation device, e.g. a velocity, which is in proportion to the number of the vehicle speed pulse per unit time, of a vehicle, in which the on-vehicle navigation system is equipped, from the vehicle speed pulse such as the one from a vehicle speed sensor or the like. Then, the detection device detects the vehicle speed pulse drop by using contradiction caused between the calculated first physical quantity and the calculated second physical quantity, for example, such a contradiction that there is an enormous difference between the calculated two kinds of velocities of the vehicle, as a detection condition. Therefore, by using the radio wave positioning data with such a positioning accuracy that generally has no causal relationship with how easily the vehicle speed pulse drop occurs, it is possible to detect the vehicle speed pulse drop with a relatively high reliability. Thus, when the vehicle speed pulse drop occurs, it becomes possible to correct the vehicle speed pulse including an error of the vehicle speed sensor, or to eliminate a use of the vehicle speed pulse including the error for displaying a current position with the on-vehicle navigation system.

In one aspect of the first apparatus of the present invention, the first calculation device calculates a velocity as the first physical quantity, the second calculation device calculates a velocity as the second physical quantity, and the detection device uses such a condition that a difference between the velocity calculated by the first calculation device and the velocity calculated by the second calculation device is more than a predetermined threshold value as one detection condition for the vehicle speed pulse drop.

According to this aspect, the first calculation device calculates the velocity as the first physical quantity based on a positioning radio wave, and the second calculation device calculates the velocity as the second physical quantity based on the vehicle speed pulse, and the detection device detects the vehicle speed pulse drop by using such a condition that a difference between these velocities is more than the predetermined threshold value. Therefore, it is possible to detect the vehicle speed pulse drop with a high reliability by a relatively simple process of monitoring inequality between the velocity difference and the threshold value.

In this aspect of the first apparatus, the apparatus is further provided with a third calculation device for calculating a velocity change amount from the radio wave positioning data and a fourth calculation device for calculating a velocity change amount from the vehicle speed pulse, wherein the detection device uses such a condition that the velocity change amount calculated by the third calculation device is less than a predetermined threshold value and the velocity change amount calculated by the fourth calculation device is more than a predetermined threshold value as another detection condition for the vehicle speed pulse drop.

By constituting in this manner, the vehicle speed pulse drop is detected by using such a condition that the velocity change amount calculated by the third calculation device is less than the predetermined threshold value and the velocity change amount calculated by the fourth calculation device is more than the predetermined threshold value as a detection condition in addition to the condition that the above mentioned velocity difference is more than the predetermined threshold value. In this manner, by using the fact that the velocity change of a vehicle is to some degree within a limited range, it is possible to detect the vehicle speed pulse drop with a very high accuracy, except extremely special cases such as traffic accident etc.

The above object of the present invention can be achieved by a second apparatus for detecting a vehicle speed pulse drop of a vehicle speed pulse in an on-vehicle navigation system, the system provided with a vehicle speed sensor, by which the vehicle speed pulse is generated, for a dead reckoning positioning, the apparatus provided with: a measurement device for measuring a pulse interval between the vehicle speed pulses generated by the vehicle speed sensor, a first hold device for at least temporarily holding a pulse interval measured for the n-th time (n is a natural number) by the measurement device; and a detection device for detecting the vehicle speed pulse drop by using such a condition that a ratio of a pulse interval measured for the (n+m)-th time (m is a natural number) with respect to the pulse interval held by the first hold device is more than a predetermined threshold value as a detection condition.

According to the second apparatus of the present invention, the measurement device measures the interval of the vehicle speed pulse. Then, the first hold device holds a pulse interval measured for the n-th time at least temporarily. For example, a buffer holds data, which show the pulse interval, every measurement. Then, the detection device detects the vehicle speed pulse drop by using such a condition that a ratio of a pulse interval measured for the (n+m)-th time with respect to the held pulse interval is more than a predetermined threshold value. Therefore, as compared with the above mentioned first apparatus for detecting the vehicle speed pulse drop, it is possible to detect the vehicle speed pulse drop by using the vehicle speed pulse exclusively without any radio wave positioning data such as GPS measurement data or the like.

Incidentally, in the second apparatus, the detection process may detect the vehicle speed pulse drop by comparing a difference between the pulse interval held by the first hold device and the pulse interval measured for the (n+m)-th time with another threshold value.

In one aspect of the second apparatus of the present invention, the apparatus is further provided with a second hold device of at least temporarily holding the pulse interval measured for the (n+m)-th time, wherein the detection device uses such a condition that a ratio of the pulse interval held by the second hold device with respect to the pulse interval held by the first hold device is more than the predetermined threshold value as a detection condition.

According to this aspect, because such a condition that a ratio of the pulse interval held by the second hold device with respect to the pulse interval held by the first hold device is more than the predetermined threshold value is used as a detection condition, it is possible to detect the vehicle speed pulse drop relatively certainly.

In another aspect of the second apparatus of the present invention, the predetermined threshold value is a variable value or a fixed value which is set in advance.

According to this aspect, as the predetermined threshold value, for example, the fixed value, which is set depending on a vehicle specification such as its weight, its engine ability, its brake control ability etc., may be used. Therefore, in the detection device, it is possible to detect the vehicle speed pulse drop by a simple comparison device such as a comparison of the fixed threshold value.

Moreover, as the predetermined threshold value, a variable value, which is variable depending on a velocity, may be used.

The above object of the present invention can be achieved by a third apparatus for detecting a vehicle speed pulse drop of a vehicle speed pulse in an on-vehicle navigation system, the system provided with a vehicle speed sensor, by which the vehicle speed pulse is generated, for a dead reckoning positioning, the apparatus provided with: a measurement device for measuring a pulse interval between the vehicle speed pulses generated by the vehicle speed sensor; a prediction device for predicting a generation time of the vehicle speed pulse, which is generated by the vehicle speed sensor and which defines an end of the pulse interval supposed to be measured for the (n+m)-th time (n and m are both natural numbers) by the measurement device, from the pulse interval measured for the n-th time by the measurement device; and a detection device for detecting the vehicle speed pulse drop, by using such a condition that the vehicle speed pulse is not generated by the vehicle speed pulse sensor even after it has elapsed the predicted generation time.

According to the third method of the present invention, the measurement process measures the pulse interval between vehicle speed pulses generated by the vehicle speed sensor. The calculation process calculates or predicts the generation time of the vehicle speed pulse, which defines an end of the vehicle speed pulse interval to be measured for the (n+m)-th time, from the pulse interval measured for the n-th time. Then, a generation time of the vehicle speed pulse which defines an end of the calculated pulse interval is predicted (calculated) from a generation time of the vehicle speed pulse generated for the last time and the predicted (calculated) pulse interval. Then, the detection process detects the vehicle speed pulse by such a condition that the vehicle speed pulse is not generated by the vehicle speed pulse sensor even after it has elapsed the predicted generation time, after comparing the current time with the predicted (calculated) generation time while monitoring a timer, for example. That is how to detect the vehicle speed pulse drop by using the vehicle speed pulse exclusively without any radio wave positioning data such as the GPS measurement data, as compared with the above mentioned the first method.

In this case, the prediction device may preferably predict (calculate) the generation time with a certain width (period), and such a condition may be preferably regarded as a detection condition that the vehicle speed pulse is not generated before the end point of the predicted generation time (period).

In one aspect of the third apparatus of the present invention, the apparatus is further provided with a first hold device of at least temporarily holding the pulse interval measured for the n-th time, wherein the prediction device predicts (calculates) the generation time from the pulse interval held by the first hold device.

According to this aspect, the generation time of the vehicle speed pulse which defines an end of the pulse interval to be measured for the (n+m)-th time is predicted (calculated) from the pulse interval measured for the n-th time which is held in a buffer or the like in the first hold device, so that it is possible to predict (calculate) the generation time relatively certainly and to detect the vehicle speed pulse on the basis of this prediction result.

In another aspect of the third apparatus, the prediction device predicts the (n+m)-th pulse interval instead of predicting the generation time, and the detection device uses such a condition that a pulse interval shorter than the predicted pulse interval is not measured by the measurement device as the detection condition instead of using the condition that the vehicle speed pulse is not generated even after it has elapsed the predicted generation time.

According to this aspect, the prediction device predicts (calculates) the (n+m)-th pulse interval. Then the detection device detects the vehicle speed pulse drop by using such a condition that a pulse interval shorter than the predicted (calculated) pulse interval is not measured by the measurement device. In this manner, it is also possible to detect the vehicle speed pulse drop in the substantially same way by comparing the pulse interval measured in the measurement device with the predicted (calculated) pulse interval.

In another aspect of the first apparatus, the detection device detects an excess generation of the vehicle speed pulse by the vehicle speed sensor by using the contradiction as a detection condition.

According to this aspect, the excess generation of the vehicle speed pulse can be detected according to the similar theory as that of detection of the vehicle speed pulse in the first apparatus. In other words, the excess generation of the vehicle speed pulse can be detected when the velocity based on the vehicle speed pulse increases so extremely that it cannot be accelerated in a real world on the basis of vehicle weight, engine output or the like as compared with the velocity based on the radio wave positioning data.

In another aspect of the second apparatus, the detection device detects the excess generation of the vehicle speed pulse by the vehicle speed sensor by using such a condition that a ratio of the pulse interval measured for the (n+m)-th time by the measurement device with respect to the pulse interval held by the first hold device is less than another threshold value as a detection condition.

According to this aspect, the excess generation of the vehicle speed pulse can be detected according to the similar theory as that of detection of the vehicle speed pulse drop in the second apparatus. Namely, the excess generation of the vehicle speed pulse can be detected when the velocity based on the vehicle speed pulse increases so rapidly that it cannot be accelerated in a real world on the basis of vehicle weight, engine output or the like.

In another aspect of the third apparatus, the detection device detects the excess generation of the vehicle speed pulse by the vehicle speed sensor by using such a condition that the vehicle speed pulse is generated by the vehicle speed sensor before the predicted generation time as a detection condition.

According to this aspect, the excess generation of the vehicle speed pulse can be detected according to the similar theory as that of detection of the vehicle speed pulse drop in the third apparatus. Namely, the excess generation of the vehicle speed pulse can be detected when the velocity based on the vehicle speed pulse increases so rapidly that it cannot be accelerated in a real world on the basis of vehicle weight, engine output or the like.

In this case, the prediction device may preferably predict (calculate) the generation time with a certain width (period) and such a condition is regarded as a detection condition that the vehicle speed pulse is not generated before an initiation point of the predicted generation time (period).

The above object of the present invention can be achieved by an on-vehicle navigation system provided with: any one of the above-mentioned first to third apparatuses for detecting a vehicle speed pulse drop of the present invention (including its various aspects); the vehicle speed sensor; a correction device for applying a correction onto the vehicle speed pulse when the vehicle speed pulse drop is detected by the apparatus for detecting the vehicle speed pulse drop; and a display device for displaying a current position based on the vehicle speed pulse.

According to this aspect of the on-vehicle navigation system of the present invention, because it is provided with any one of the first to third apparatuses for detecting the vehicle speed pulse drop of the present invention as described above, even if the vehicle speed pulse drop occurs, it can be detected with a high accuracy. Therefore, the correction device can corrects the vehicle speed pulse including an error caused by the vehicle speed pulse drop pulse, so that the display device can display a current position based on the vehicle speed pulse with a high accuracy.

In one aspect of the on-vehicle navigation system of the present invention, the system is further provided with a radio wave positioning apparatus for outputting radio wave positioning data, wherein the display device displays the current position based on the radio wave positioning data in addition to the vehicle speed pulse.

According to this aspect, the display device displays the current position based on the radio wave positioning data in addition to the vehicle speed pulse, and thus, even if the vehicle speed pulse drop occurs, it can be detected with a high accuracy and it may become possible not to use the vehicle speed pulse including an error caused by the vehicle speed pulse drop for calculation of the current position. Therefore, the current position can be displayed even if the vehicle speed pulse drop occurs.

The above object of the present invention can be also achieved by a program storage device readable by a computer. The program storage device stores a program of instructions to cause the computer to function as at least one portion of any one of the above described first to third methods of the present invention (including its various aspects).

According to the program storage device, such as a CD-ROM (Compact Disc—Read Only Memory), a ROM, a DVD-ROM (DVD Read Only Memory), a floppy disk or the like, of the present invention, the above described first method of the present invention can be relatively easily realized as a computer reads and executes the program of instructions or as it executes the program after downloading the program through communication device. Moreover, the program of instructions can be sent from a central device with an application program required for the navigation or other data such as a map.

The above object of the present invention can be also achieved by a first computer data signal embodied in a carrier wave and representing a series of instructions for a computer. The series of instructions causes the computer to function as at least one portion of any one of the above described first to third methods of the present invention (including its various aspects).

According to the computer data signal embodied in the carrier wave of the present invention, as the computer downloads the program in the computer data signal through a computer network or the like, and executes this program, it is possible to realize the above described first method of the present invention.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(I) First Embodiment

Figure 1:
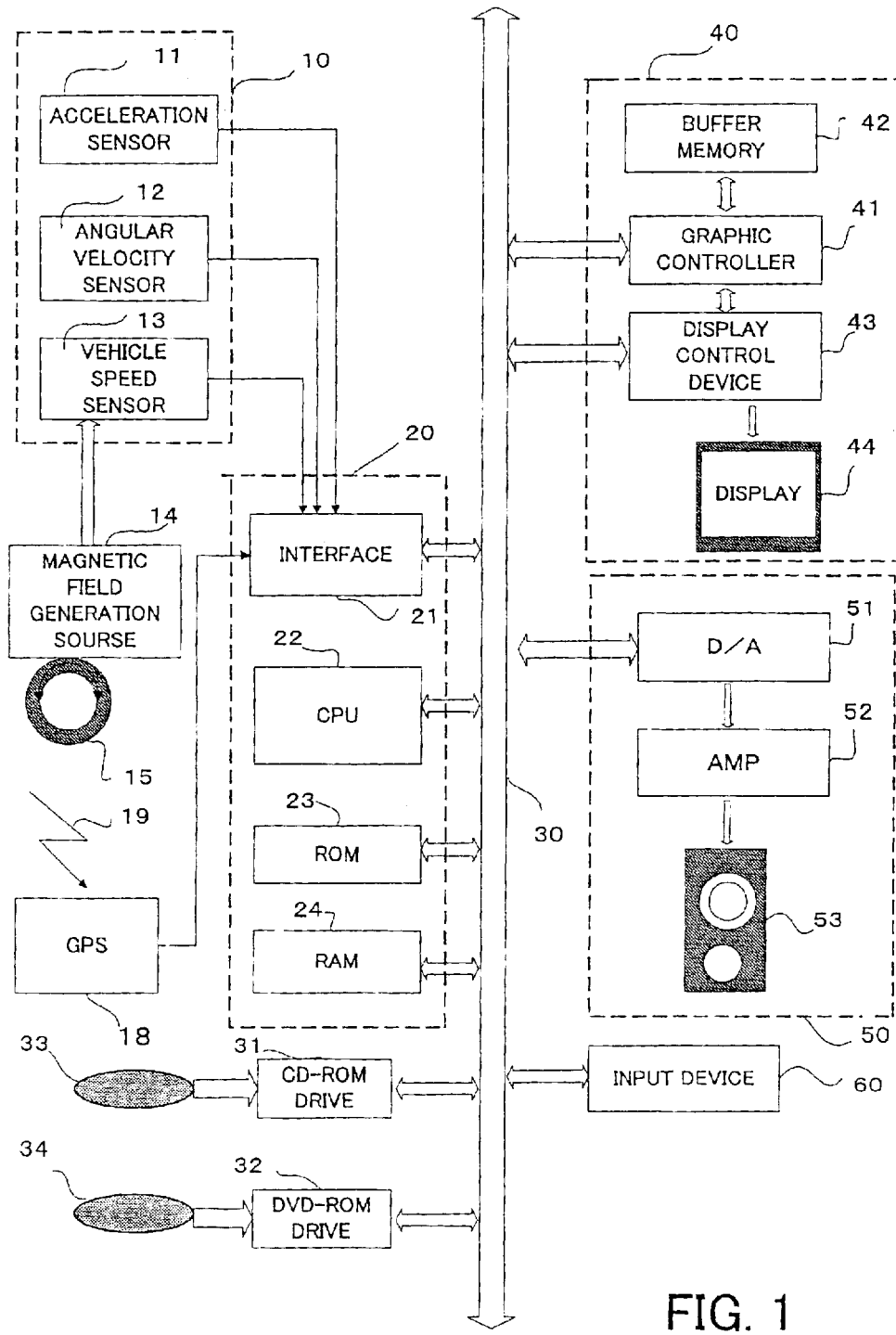
FIG. 1 is a block diagram of an on-vehicle navigation system as a first embodiment of the present invention.
Figure 2:
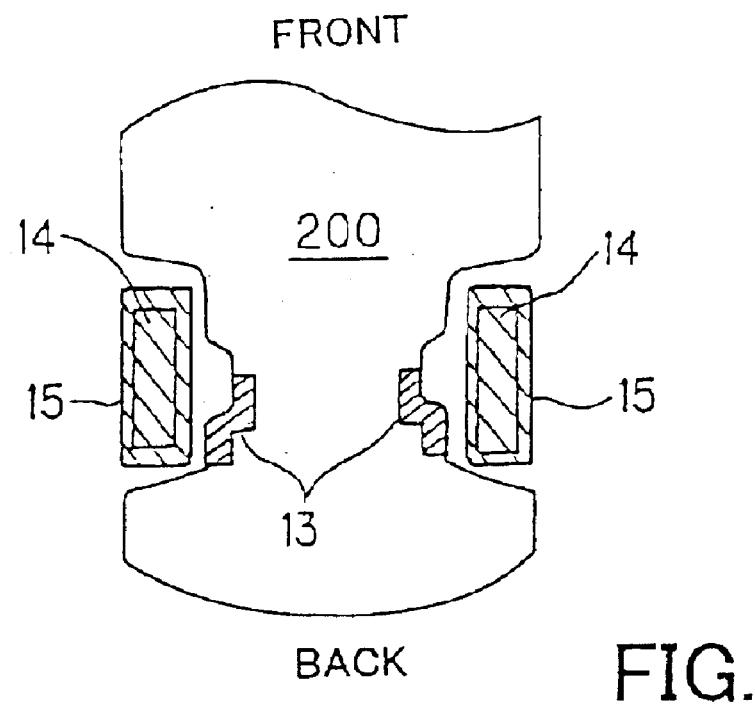
FIG. 2 is a schematic partial plan view showing attached positions of a vehicle speed sensor and a generation source of a vehicle speed pulse in a vehicle in the first embodiment.
Figure 3:
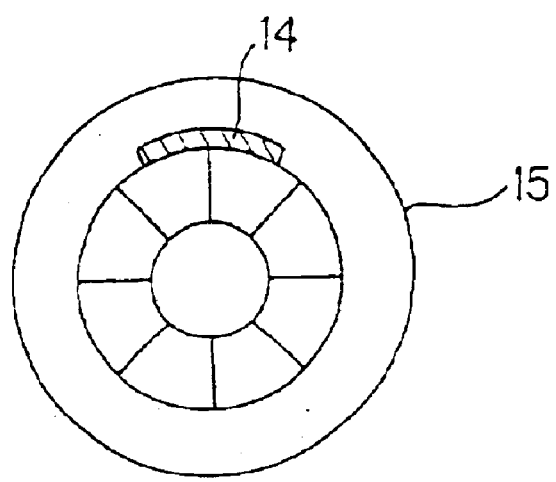
FIG. 3 is a schematic plan view of a tire showing the attached position of the generation source of the vehicle speed pulse in the first embodiment.

At first, a structure of an on-vehicle navigation system in the first embodiment will be explained with reference to FIG. 1 to FIG. 3. FIG. 1 is a block diagram of an on-vehicle navigation system as the first embodiment of the present invention. FIG. 2 is a schematic partial plan view showing attached positions of a vehicle speed sensor and a generation source of a vehicle speed pulse in a vehicle. FIG. 3 is a schematic plan view of a tire showing the attached position of the generation source of the vehicle speed pulse.

As shown in FIG. 1, the on-vehicle navigation system in the first embodiment is provided with a dead reckoning positioning apparatus 10, a GPS apparatus 18 as one example of a radio wave positioning apparatus, a system controller 20, a CD-ROM drive 31, a DVD-ROM drive 32, a display unit 40, an audio output unit 50, and an input device 60.

The dead reckoning positioning apparatus 10 is constructed to include an acceleration sensor 11, an angular velocity sensor 12, and a vehicle speed sensor 13. The acceleration sensor 11, which has, for example, a piezoelectric element, detects an acceleration of a vehicle and outputs acceleration data. The angular velocity sensor 12, which has, for example, a vibration gyro, detects an angular velocity of a vehicle when a direction of the vehicle is changed and outputs angular velocity data and relative azimuth data.

The vehicle speed sensor 13 detects the rotation of a vehicle shaft and generates the vehicle speed pulse as a pulse signal at every rotation for a predetermined angle such as 90, 180, 360 degrees etc. around the vehicle shaft. This kind of the vehicle speed sensor 13 is constructed to detect a rotation angle position of the vehicle shaft magnetically or optically and to generate the vehicle speed pulse. In this embodiment, it is especially constructed to detect the vehicle speed pulse drop with a high accuracy and to restrain the generation of a positioning error on the basis of the detected vehicle speed pulse drop, as described later in detail. Therefore, in this embodiment, the vehicle speed sensor 13 of a magnetically detecting type is preferably used, which has such a shortcoming that the vehicle speed pulse drop tends to occur easily, as described below.

More specifically, as shown in FIG. 2 and FIG. 3, for example, in the case that a tire 15 of a vehicle 200 is a steel radial tire, a steel belt inside the tire 15 is employed as a magnetic field generation source 14, while the vehicle speed sensor 13 is attached to a portion of the vehicle 200 opposed to the tire 15. Incidentally, as the radial tire, a textile radial tire using highly rigid textile such as polyester etc. as a code layer is considered. As for this kind of radial tire, the magnetic field generation source 14 is constructed by magnetizing another magnetic body (e.g., a disk or a wheel constituting a control device) or by placing a magnet firmly and separately in it. As the magnet, what is conventionally well known such as various types of permanent magnets or the like, can be used. Moreover, as to other types of tires such as a bias tire etc., the magnetic field generation source 14 can be constructed by magnetizing a magnetic body part or by placing a magnet firmly and separately in it.

In FIG. 1 again, the GPS apparatus 18 is a part to receive a positioning radio wave 19 including signals, which indicate the data for positioning from a plurality of satellites to be used for the detection of a vehicle position (e.g., latitude, longitude).

The system controller 20 includes an interface 21, a CPU (Central Processing Unit) 22, a ROM (Read Only Memory) 23 and a RAM (Random Access Memory) 24 and is constructed to control the whole navigation apparatus.

The interface 21 performs an interface operation for the acceleration sensor 11, the angular velocity sensor 12, the vehicle speed sensor 13, and the GPS apparatus 18. Then from them respectively, it inputs into the system controller 20 the acceleration data, the relative azimuth data, the angular velocity data, the GPS measurement data, the GPS azimuth data etc. in addition to the vehicle speed pulse. The CPU 22 controls the whole system controller 20. The ROM 23 has a not-illustrated non-volatile memory where a control program etc. for controlling a system controller 20 is stored. The RAM 24 readably stores various types of data such as route data, which are set in advance by a user through the input device 60, and supplies a working area to the CPU 22.

The system controller 20, the CD-ROM drive 31, the DVD-ROM drive 32, the display unit 40, the audio output unit 50, and the input device 60 are mutually connected through a bus line 30.

The CD-ROM drive 31 and the DVD-ROM drive 32, under the control of the system controller 20, read a control program corresponding to each embodiment described below and various types of data such as road data etc. including the number of traffic lanes, a road width, and the like from a CD 33 and a DVD 34, respectively, and then output them. Incidentally, it is possible to dispose either one of the CD-ROM drive 31 and the DVD-ROM drive 32, and it is also possible to dispose a CD and DVD compatible drive.

The display unit 40, under the control of the system controller 20, displays various types of display data. The display unit 40 is provided with: a graphic controller 41, which controls the whole display unit 40 on the basis of control data transmitted from the CPU 22 through the bus line 30; a buffer memory 42, which is constructed by a memory such as a VRAM (Video RAM) etc. and temporarily memorizes immediately displayable image information; a display control device 43, which controls of display of a display 44 such as a liquid crystal device, a CRT (Cathode Ray Tube), or the like on the basis of image data outputted from the graphic controller 41; and the display 44. The display 44 is constructed by a liquid crystal display device etc., on the order of 5 to 10 inches in diagonal length for example and is installed around a front panel inside the vehicle.

The audio output unit 50 is provided with: a D/A (Digital to Analog) converter 51, which performs a D/A conversion of the sound digital data transmitted through the bus line 30 from the CD-ROM drive 31, the DVD-ROM drive 32, or the RAM 24 etc., under the control of the system controller 20; an amplifier (AMP) 52, which amplifies a sound analog signal outputted from the D/A converter 51; and a speaker 53, which converts the amplified sound analog signal to a sound and outputs it into the vehicle.

The input device 60 is provided with a key, a switch, a button, a remote controller, and so on, to input various types of commands and data. The input device 60 is installed around the display 44 or the front panel of a main body of the on-vehicle navigation system, which is mounted on the vehicle.

Especially in the first embodiment, a first calculation device for calculating a velocity V1 from the GPS measurement data of the GPS apparatus 18, a second calculation device for calculating a velocity V2 from the vehicle speed pulse of the vehicle speed sensor 13, and a detection device for detecting the vehicle speed pulse drop by using a contradiction caused between the velocity V1 and the velocity V2 as a detection condition are constructed by the system controller 20, which executes a computer program stored in the CD 33, the DVD 34, the ROM 23 etc.

A method of detecting the vehicle speed pulse drop in the first embodiment as well as the second embodiment and the third embodiment as described below, is intended to be executed mainly in the CPU 22 and is executed as one portion of a main navigation program which controls the whole on-vehicle navigation system to perform a navigation operation. Therefore, while executing the main navigation system program, operations shown in each flow chart of the embodiments are being executed. Moreover, the computer program in this kind may be stored in the ROM 23, the CD-ROM drive 31, or the DVD-ROM drive 32, or may be downloaded into the RAM 24 or the like through a communication device such as a modem, a cell phone, or the like. Instead of or in addition to it, map data etc., required for the navigation may be downloaded.

Figure 4:
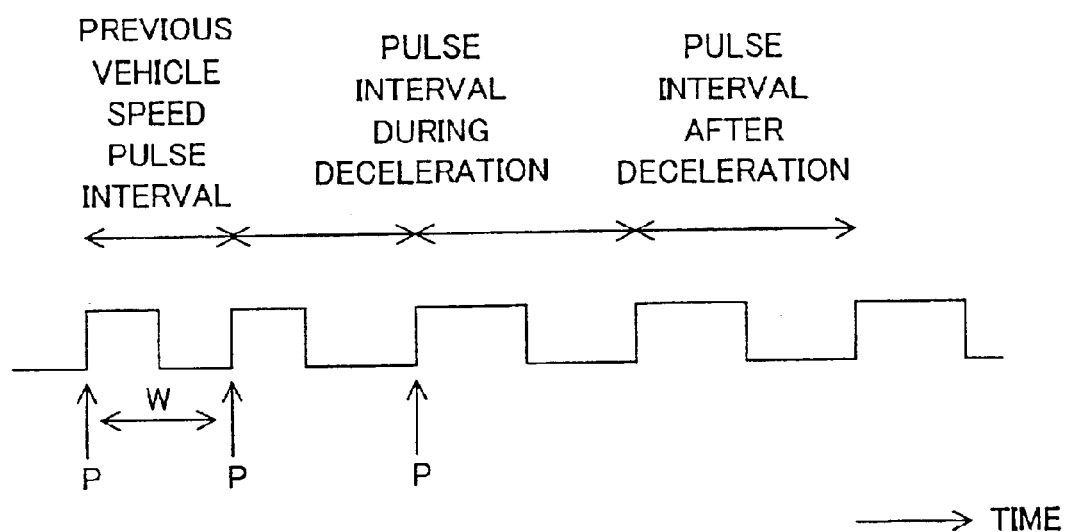
FIG. 4 is a time chart showing a vehicle speed pulse interval in the first embodiment.
Figure 5:
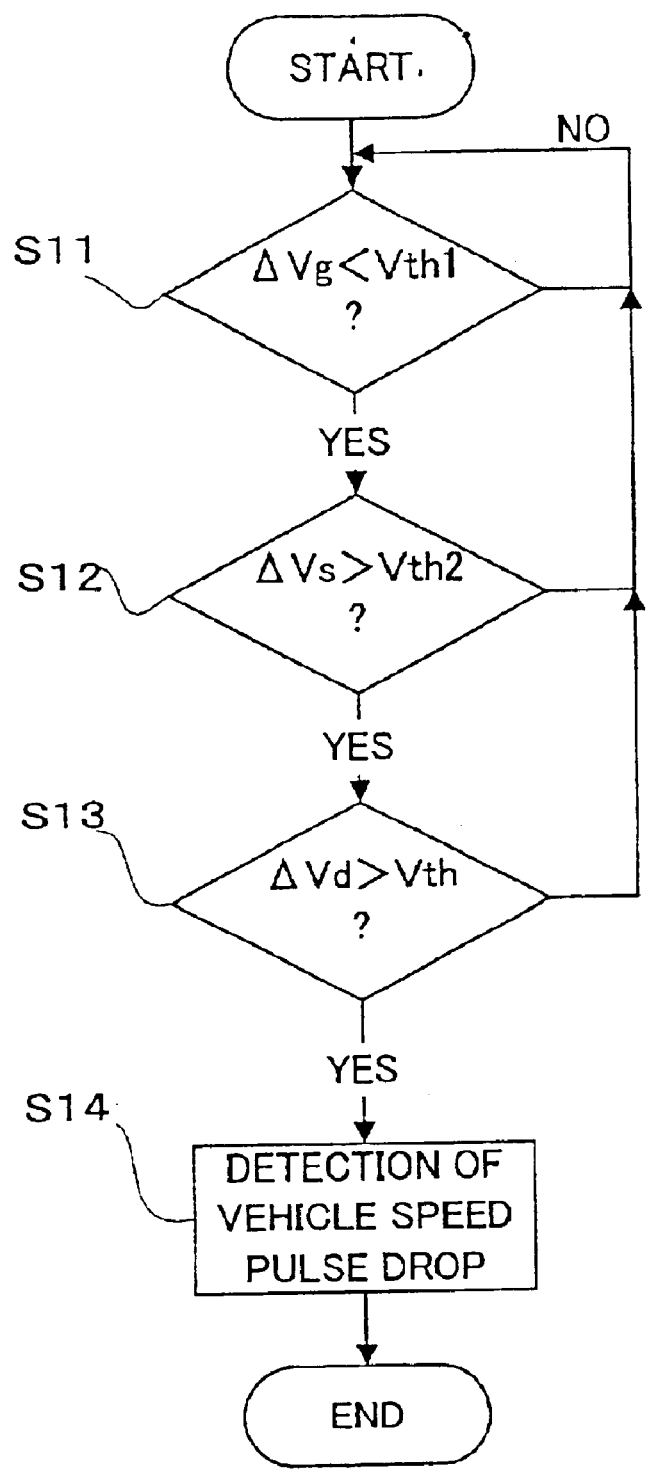
FIG. 5 is a flow chart of a method of detecting the vehicle speed pulse in the first embodiment.

Next, the method of detecting the vehicle speed pulse drop in the on-vehicle navigation system in the first embodiment, as constructed above, will be explained with reference to FIG. 4 and FIG. 5. Here, FIG. 4 is a time chart showing a vehicle speed pulse interval in the first embodiment. FIG. 5 is a flow chart of the method of detecting the vehicle speed pulse in the first embodiment.

As shown in FIG. 4, assuming that a vehicle is traveling (i.e., moving or stopping) as an initial condition, a vehicle speed pulse interval W, which is an interval of a vehicle speed pulse P, changes in response to deceleration or acceleration. More concretely, the acceleration of the vehicle decreases the vehicle speed pulse interval W while the deceleration of the vehicle increases the vehicle speed pulse interval W. In other words, in the ideal case that there is neither vehicle speed pulse drop nor excess generation of the vehicle speed pulse P, the vehicle speed pulse interval W is supposed to be changed depending on a ratio of the acceleration to the deceleration of the vehicle (to be in inverse proportion to the vehicle speed).

Here, according to the inventors' research, there is little or no possibility that a vehicle in a real world can physically decelerate at more than a certain constant ratio, in association with the fact that its weight, its engine output, its ability of brake control etc. are to some degree within a limited range, except extremely special cases such as a traffic accident etc. In the same manner, there is also little or no possibility that it can physically accelerate at more that a certain constant ratio, except extremely special cases. Therefore, in the same manner, there is little or no possibility that the vehicle speed pulse interval W physically changes at more than a certain constant ratio, except extremely special cases.

The inventors focused on this physical fact and constructed the embodiment such that the detection of the pulse drop (further, the excess generation of the vehicle speed pulse P) is performed by detecting that the vehicle speed pulse interval W exhibits a change more than a certain constant ratio, which is not usually caused.

With reference to FIG. 5, a velocity Vg of a vehicle, which is in proportion to a moving distance per unit time of a GPS position, is firstly calculated as one example of the first physical quantity of a predetermined type from the GPS measurement data of the GPS apparatus 18, while a velocity Vs of the vehicle, which is in proportion to the number of the vehicle speed pulse per unit time, is simultaneously calculated from the vehicle speed pulse of the vehicle speed sensor 13. Then, it is judged whether or not a change amount $\Delta Vg$, which is an amount changed within a predetermined time duration in the Vg of the vehicle based on the GPS measurement, is less than a predetermined threshold value Vth1; i.e., it is judged whether or not $\Delta Vg < Vth1$ (step S11).

As long as the velocity change amount $\Delta Vg$ is equal to or more than the predetermined threshold value Vth1 (step S11: NO), the vehicle speed pulse is not detected, that is, the navigation operation is continued as usual.

Here, if $\Delta Vg < Vth1$ (step S11: YES), i.e. if the velocity change based on the GPS is less than the constant value and the vehicle is driving at a nearly constant rate, a situation is regarded as one in which the presence or absence of the vehicle speed pulse drop is to be detected. Then, it is judged whether or not a change amount $\Delta Vs$, which is an amount changed within a predetermined time duration in the Vs of the vehicle based on the vehicle speed pulse, is more than a predetermined threshold value Vth2; i.e., it is judged whether or not $\Delta Vs > Vth2$ (step S12).

As long as the velocity change amount $\Delta Vs$ is equal to or less than the predetermined threshold value Vth2 (step S12: NO), a situation is regarded as one without generating the vehicle speed pulse drop and the operational flow returns to step S11 and the navigation operation is continued as usual.

Here, if $\Delta Vs > Vth2$ (step S12: YES), a situation is regarded as one with a possibility of generation of the vehicle speed pulse drop. Then, as for a velocity difference $\Delta Vd$ between the velocity Vg based on the GPS and the velocity Vs based on the vehicle speed pulse, i.e., as for $Vg - Vs = \Delta Vd$, it is judged whether or not $\Delta Vd > Vth$ (step S13).

If it is not $\Delta Vd > Vth$ in this judgment (step S13: NO), a situation is regarded as one without generating the vehicle speed pulse drop and the operational flow returns to step S11 and the navigation operation is continued as usual.

On the other hand, if $\Delta Vd > Vth$ (step S13: YES), a situation is judged as one with the vehicle speed pulse drop. Then, the usual navigation operation, which has been performed, associated with the calculations of the moving distance and the velocity based on the vehicle speed pulse, is switched to a special processing employed in the case of generation of the vehicle speed pulse drop (step S14). More concretely, the system controller 20 performs an error-correction or compensation processing with respect to the vehicle speed pulse including an error of the vehicle speed sensor 13, on the basis of the vehicle speed pulse generated in the past and/or the future and compensates for the velocity and the moving distance, for example. Alternatively, for a period while the vehicle speed pulse is generated, it temporarily stops to employ the positioning system based on the vehicle speed pulse and calculates the velocity, the moving distance, the current position, and so on, on the basis of the GPS measurement. Then, as soon as the detection of the vehicle speed pulse drop is ended, a detection cycle shown in FIG. 5, prepared for the next vehicle speed pulse drop, restarts as an interrupt process, a sub routine process or the like as a part of the navigation operation.

Therefore, according to the first embodiment, the vehicle speed pulse drop can be detected with a high reliability by a relatively simple process of monitoring the inequality between the velocity change amount or the velocity difference and the corresponding threshold value, it is useful in practice.

Especially, because of not only the judgment in step S13 but also the judgments in steps S11 and S12, a situation in which the vehicle speed pulse drop is accidentally detected can be effectively avoided, except extremely special cases such as a traffic accident etc.

(II) Second Embodiment

Figure 6:
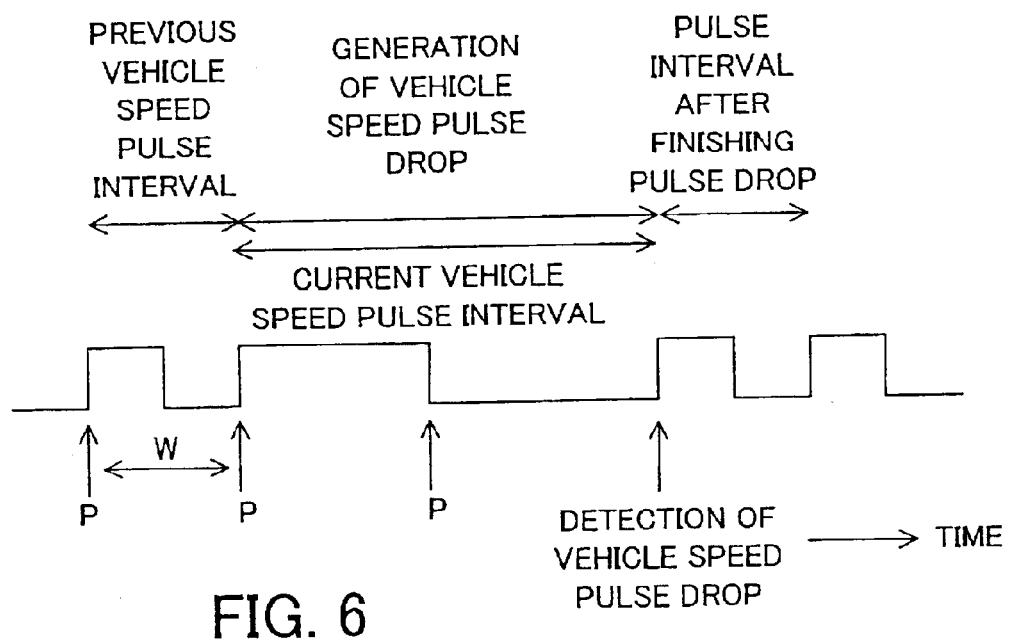
FIG. 6 is a time chart showing a vehicle speed pulse interval in a second embodiment.
Figure 7:
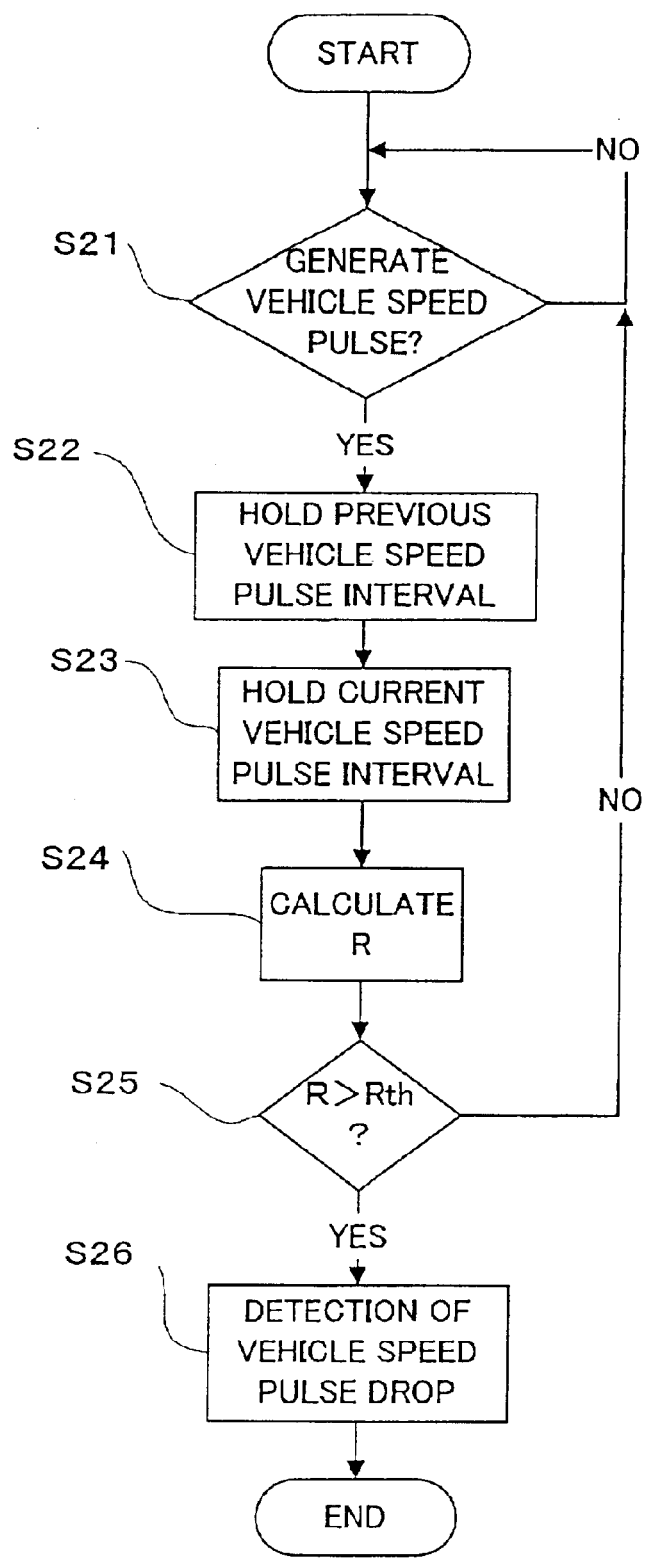
FIG. 7 is a flow chart of a method of detecting the vehicle speed pulse in the second embodiment.

Next, the second embodiment of the present invention will be explained with reference to FIG. 6 and FIG. 7. FIG. 6 is a time chart showing a vehicle speed pulse interval in the second embodiment. FIG. 7 is a flow chart of a method of detecting the vehicle speed pulse in the second embodiment. The structure of hardware of the second embodiment is the same as that of the first embodiment. Incidentally, the method of detecting the vehicle speed pulse drop in the second embodiment is intended to be performed independently from the radio wave positioning such as the GPS measurement etc., and thus can be performed in the on-vehicle navigation system based only on the dead reckoning positioning system.

As shown in FIG. 6, in the method of detecting the vehicle speed pulse drop of the second embodiment, the pulse interval W of the vehicle speed pulse P is measured every time the vehicle speed pulse P is generated. Then, every measurement, a buffer temporarily holds the pulse interval W measured previously. After that, the detection of the vehicle speed pulse drop is performed by the fact that a ratio R of the pulse interval W measured currently to the pulse interval W held in the buffer is more than a predetermined threshold value.

Namely, with reference to FIG. 7, the generation of the vehicle speed pulse is firstly monitored (step S21) and in the case of generation (step S21: YES), the previous vehicle speed pulse interval is held in one buffer (step S22) and the current vehicle speed pulse interval is held in another buffer with the generation of the vehicle speed pulse after the previous time (step S23). Incidentally, the buffer in this kind may be prepared exclusively inside the system controller 20, or one portion of the RAM 24 may be used as a buffer region.

Next, the ratio R of the pulse interval held in the step S23 to the pulse interval held in the step S22 (=the current pulse interval W/the previous pulse interval W) is calculated (step S24). Then, it is judged whether or not this ratio R is more than a predetermined threshold value Rth, i.e., it is judged whether or not R>Rth holds true (step S25). This threshold value Rth is a fixed value, which is set depending on vehicle specifications such as weight, engine ability, brake control ability, and the like or which is fixed independently of vehicle types, and is intended to be set in advance, experientially, experimentally, theoretically, or simulationally etc.

If it is not R>Rth in this judgment (step S25: NO), a situation is regarded as one without generating the vehicle speed pulse drop and the operational flow returns to step S21 and the navigation operation is continued as usual.

On the other hand, if R>Rth (step S25: YES), a situation is judged as one with the vehicle speed pulse drop. Then, the usual navigation operation, which has been performed until the judgment, associated with the calculation of the moving distance and the velocity based on the vehicle speed pulse, is switched to a special processing employed in the case of generation of the vehicle speed pulse drop (step S26). Then, as soon as the detection of the vehicle speed pulse drop is ended, a detection cycle shown in FIG. 7, prepared for a next vehicle speed pulse drop restarts as an interrupt process, a sub routine process or the like as a part of the navigation operation Therefore, according to the second embodiment, the vehicle speed pulse drop can be detected with a high reliability by a relatively simple process of monitoring the inequality between the vehicle speed pulse interval and the threshold value; it is useful in practice. Especially, the detection of the vehicle speed pulse drop can be performed without GPS measurement data. Thus, there is no use of the velocity averaged over a predetermined time duration, for example, 1/10, 1, or 2 sec, as in the case of the GPS measurement. Consequently, the detection accuracy in the detection of the vehicle speed pulse drop can be certainly improved.

(III) Third Embodiment

Figure 8:
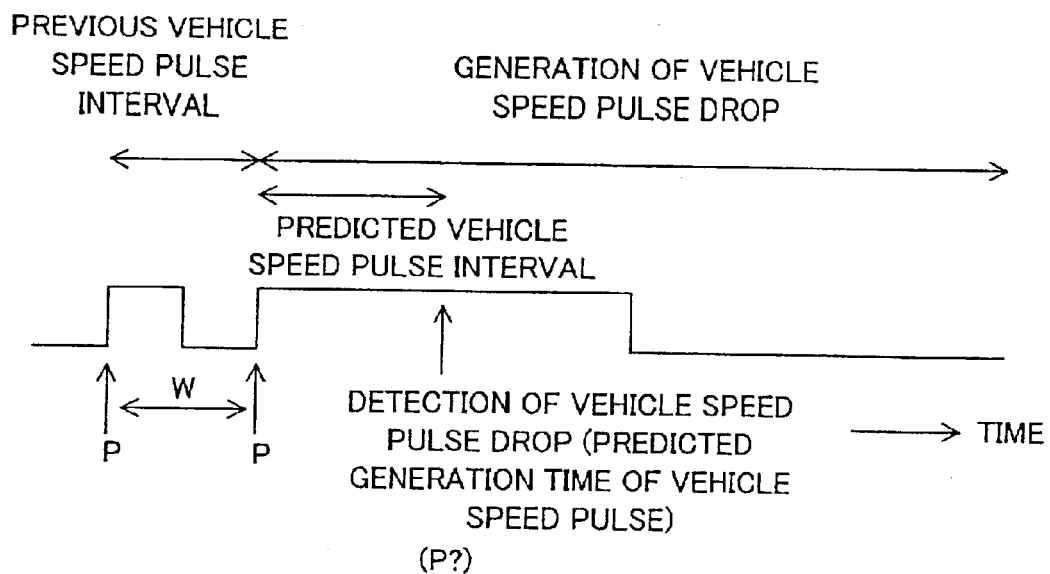
FIG. 8 is a time chart showing a vehicle speed pulse interval in a third embodiment.
Figure 9:
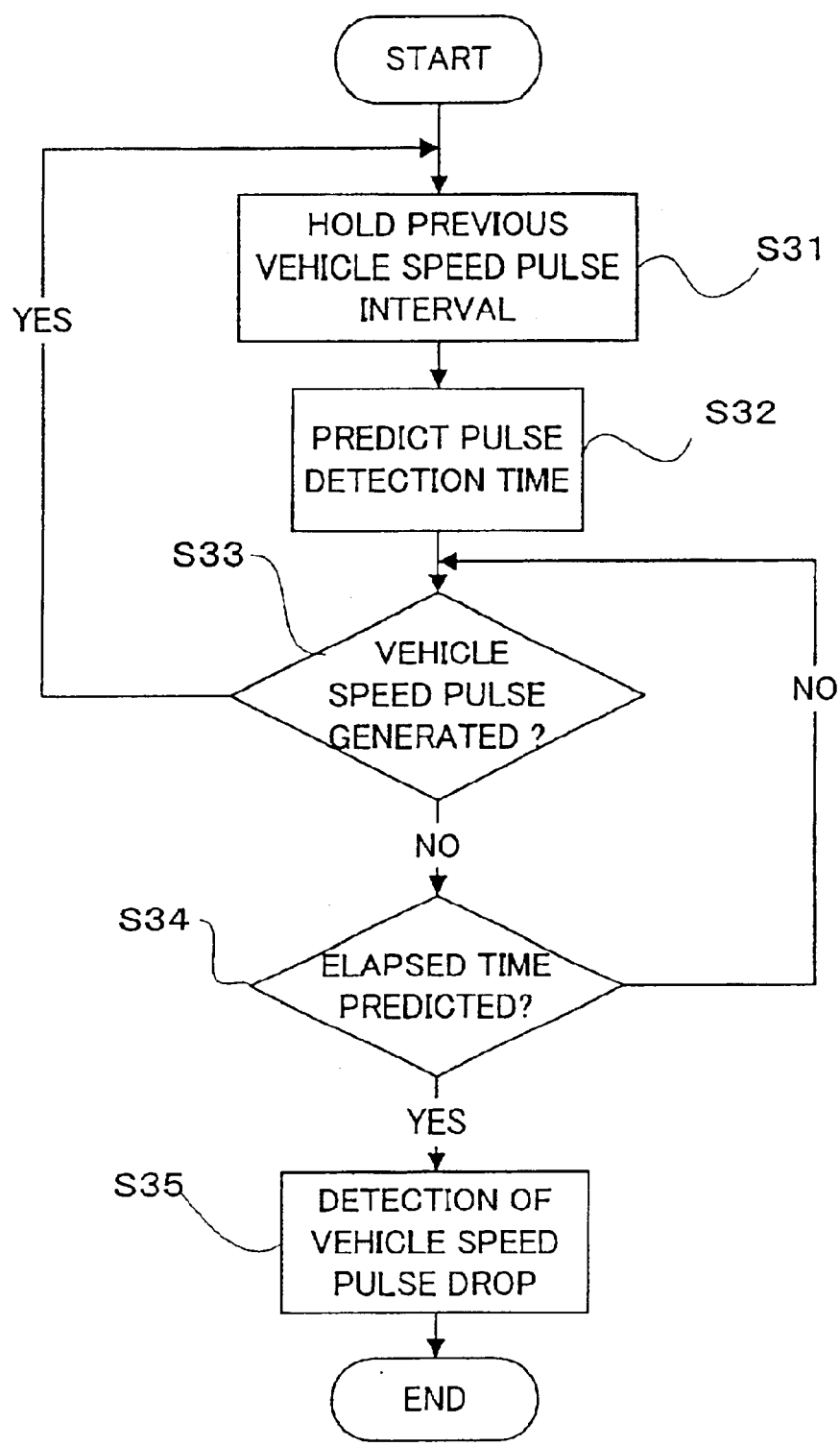
FIG. 9 is a flow chart of a method of detecting the vehicle speed pulse in the third embodiment.

Next, the third embodiment of the present invention will be explained with reference to FIG. 8 and FIG. 9. FIG. 8 is a time chart showing a vehicle speed pulse interval in the third embodiment. FIG. 9 is a flow chart of a method of detecting the vehicle speed pulse in the third embodiment. The structure of hardware of the third embodiment is the same as that of the first embodiment. Incidentally, the method of detecting the vehicle speed pulse drop in the third embodiment is intended to be performed independently from the radio wave positioning such as the GPS measurement etc., and thus can be performed in the on-vehicle navigation system based only on the dead reckoning positioning system.

As shown in FIG. 8, in the method of detecting the vehicle speed pulse drop of the third embodiment, the pulse interval W of the vehicle speed pulse P is measured every time the vehicle speed pulse P is generated. Then, from the pulse interval W measured previously, a generation time of the vehicle speed pulse, which defines an end of the pulse interval W to be measured currently, is predicted (calculated). After that, the detection of the vehicle speed pulse drop is performed by the fact that the next vehicle speed pulse is not generated even after it has elapsed the predicted (calculated) generation time.

Namely, with reference to FIG. 9, the previous vehicle speed pulse interval, which is calculated with the generation of the vehicle speed pulse, is firstly held in one buffer (step S31). Then, from the previous vehicle speed pulse interval, the generation time of the vehicle speed pulse, which defines the end of the vehicle speed pulse interval to be measured currently, is predicted. For example, the pulse interval to be measured currently is predicted (calculated) by an expression such as $1-\alpha<$(the pulse interval to be measured currently/the pulse interval measured previously)$<1+\alpha$ (wherein $\alpha$ is a coefficient set in advance in consideration of acceleration and deceleration of the vehicle), and then, the generation time of the vehicle speed pulse to be measured currently is predicted (calculated) by adding the predicted (calculated) pulse interval to the generation time of the vehicle speed pulse which defines the end of the previously measured pulse interval (step S32).

Next, the generation of the vehicle speed pulse is monitored (step S33). As long as the vehicle speed pulse is not generated (step S33: NO), with reference to a timer equipped within the system controller 20, it is monitored whether or not the current time passes the predicted (calculated) generation time (step S34). As long as the current time does not pass the predicted generation time (step S34: NO), the operational flow returns to the step S33 and the generation of the vehicle speed pulse is monitored.

As a result of these judgments, if the current time does not pass the predicted time (step S34: NO) and the vehicle speed pulse is generated (step S33: YES), a situation is regarded as one without generating the vehicle speed pulse drop and the operational flow returns to step S31 and the navigation operation is continued as usual.

On the other hand, if the vehicle speed pulse is not generated in the step S33 (step S33: NO) and the current time passes the predicted time (step S34: YES), a situation is judged as one with the vehicle speed pulse drop. Then, the usual navigation operation, which has been performed until the judgment, associated with the calculation of the moving distance and the velocity based on the vehicle speed pulse, is switched to a special processing employed in the case of generation of the vehicle speed pulse drop (step S35). Then, as soon as the detection of the vehicle speed pulse drop is ended, a detection cycle shown in FIG. 9, prepared for a next vehicle speed pulse drop restarts as an interrupt process, a sub routine process etc., as a part of the navigation operation.

Therefore, according to the third embodiment, the vehicle speed pulse drop can be detected with a high reliability by a relatively simple process of monitoring whether or not the current time passes the predicted time; it is useful in practice. Especially, the detection of the vehicle speed pulse drop can be performed without GPS measurement data. Thus, there is no use of the velocity averaged over a predetermined time duration, for example, 1/10, 1, or 2 sec, as in the case of the GPS measurement. Consequently, the detection accuracy in the detection of the vehicle speed pulse drop can be certainly improved.

In the predicting or calculating process, not only from the previously measured pulse interval but also from the pulse interval measured one time before the previous time, the generation time of the vehicle which defines the end of the current pulse interval may be predicted or calculated. Moreover, it is possible to predicted or calculate the current pulse interval instead of the generation time, and to regard it as a detection condition whether or not the pulse interval, which is shorter than the calculated one, is actually measured.

(IV) Fourth Embodiment

Figure 10:
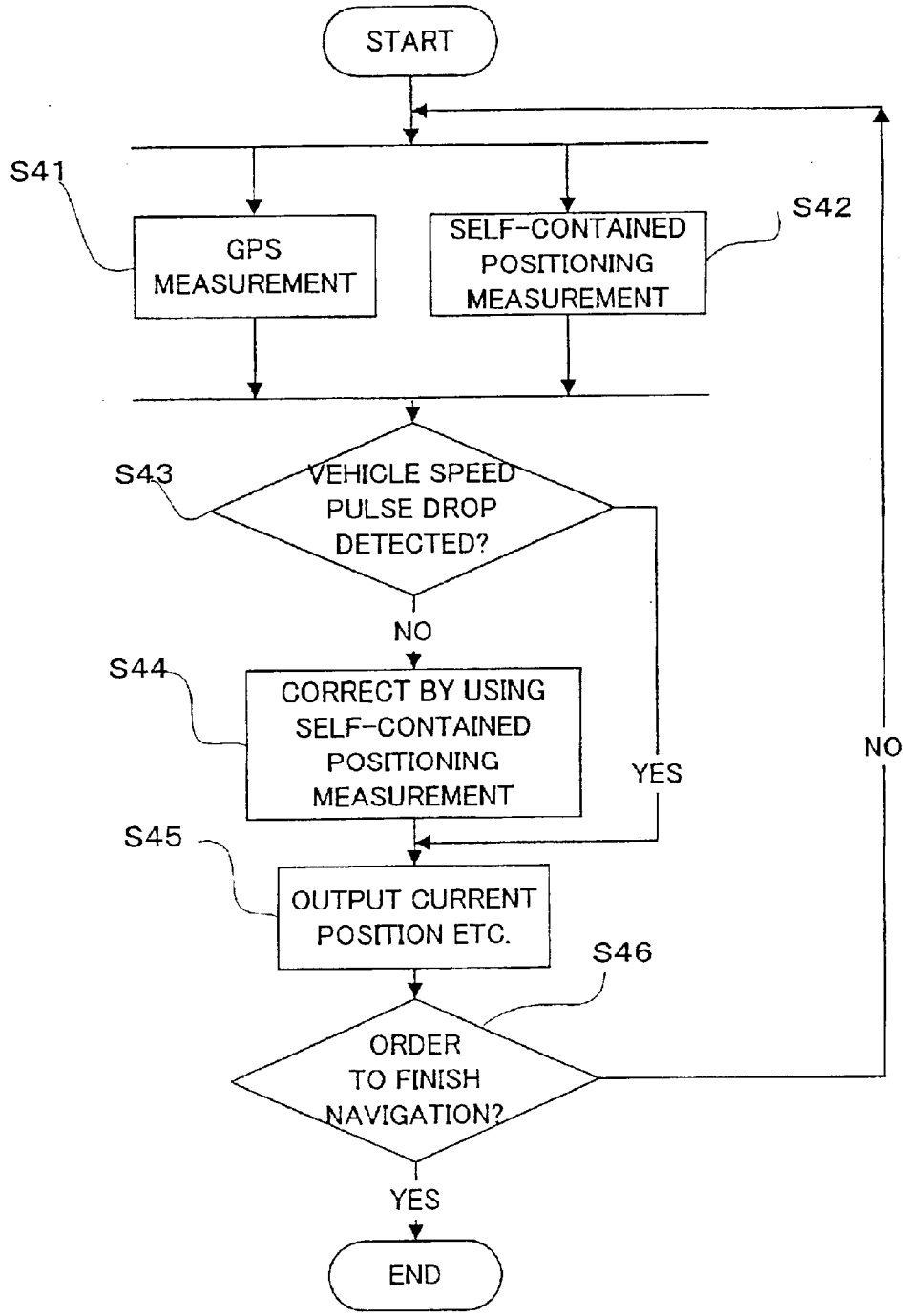
FIG. 10 is a flow chart showing an operation of an on-vehicle navigation system in a fourth embodiment.

Next, the fourth embodiment of the present invention will be explained with reference to FIG. 10. FIG. 10 is a flow chart showing a navigation operation of an on-vehicle navigation system in the fourth embodiment. The structure of hardware of the fourth embodiment is the same as that of the first embodiment.

The fourth embodiment is associated with a navigation system including at least one of the methods of detecting the vehicle speed pulse drop in the first to the third embodiments, as described above.

Namely, in the fourth embodiment, the GPS measurement is firstly performed by the GPS apparatus 18 (step S41). Along with this, the dead reckoning positioning is performed by the dead reckoning positioning apparatus 10 including the vehicle speed sensor 13 (step S42). Then, it is judged whether or not the vehicle speed pulse drop is detected by at least one of the methods of detecting the vehicle speed pulse drop of the first to the third embodiments described above (step S43).

As a result of this judgment, if the vehicle speed pulse drop is not detected (step S43: NO), the dead reckoning positioning measurement is regarded as one with a high accuracy. Thus, an error correction based on the dead reckoning positioning is applied onto the vehicle speed, the moving distance, the current position or the like based on the GPS (step S44). Then, a predetermined type of output is performed such as displaying the current position or the like after this error correction or compensation on a map of the display 44 (step S45).

On the other hand, if the vehicle speed pulse drop is detected (step S43: YES), the dead reckoning positioning is regarded as one with a low accuracy because of the effect of the vehicle speed pulse drop. Thus, the predetermined type of output is performed such as displaying the current position or the like on the map of the display 44 without applying the error correction or compensation based on the dead reckoning positioning onto the vehicle speed, the moving distance, the current position or the like based on the GPS (step S45).

Then, if an order to finish the navigation is not inputted (step S46: NO), the operational flow returns to the steps S41 and S42 and the navigation operation is continued as usual.

On the other hand, if the order to finish the navigation is inputted (step S46: YES), a series of navigation operations is finished.

As described above, according to the forth embodiment, when the vehicle speed pulse drop is not generated, an effective use of the result of the dead reckoning positioning based on the vehicle speed pulse leads to a high positioning accuracy of the finally obtained current position or the like. On the other hand, when the vehicle speed pulse drop is generated, nonuse of the dead reckoning positioning based on the vehicle speed pulse avoids the deterioration in the positioning accuracy of the finally obtained current position or the like. Thus, it is possible to achieve the high positioning accuracy on the whole, by combining the dead reckoning positioning measurement and the GPS measurement.

(V) Fifth Embodiment

Figure 11:
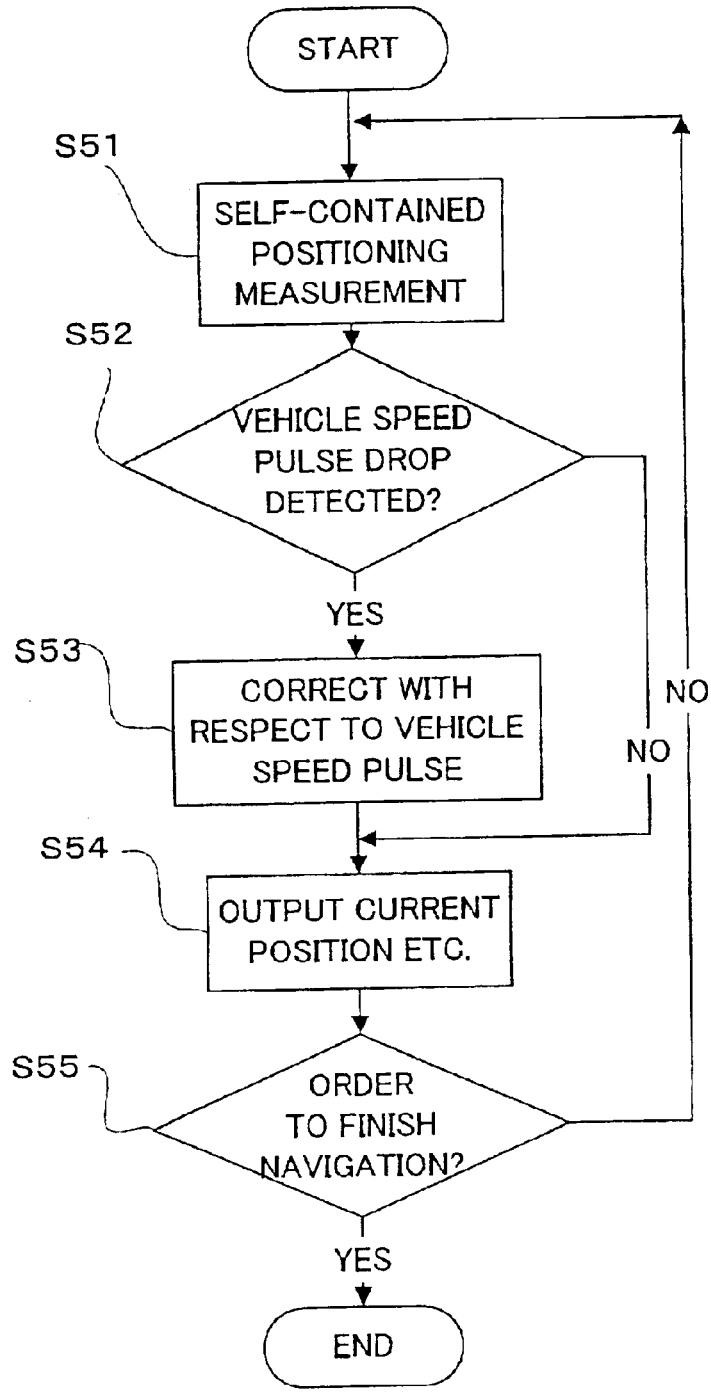
FIG. 11 is a flow chart showing an operation of an on-vehicle navigation system in a fifth embodiment.

Next, the fifth embodiment of the present embodiment will be explained with reference to FIG. 11. Here, FIG. 11 is a flow chart showing an operation of an on-vehicle navigation system in the fifth embodiment. The structure of hardware of the fifth embodiment is the same as that of the first embodiment. The navigation system in the fifth embodiment is performed independently from the radio wave positioning measurement such as the GPS measurement and thus can be performed even in the on-vehicle navigation system based only on the dead reckoning positioning measurement.

The fifth embodiment is associated with a navigation system including at least one of the methods of detecting the vehicle speed pulse drop in the first to the third embodiment as described above.

Namely, in the fifth embodiment, the dead reckoning positioning is firstly performed by the dead reckoning positioning apparatus 10 including the vehicle speed sensor 13 (step S51). Then, by at least one of the methods of detecting the vehicle speed pulse drop in the first to third embodiments, it is judged whether or not the vehicle speed pulse drop is detected (step S52).

As a result of this judgment, if the vehicle speed pulse drop is not detected (step S52: NO), the dead reckoning positioning measurement is regarded as one with a substantially high accuracy. Thus, a predetermined type of output is performed such as displaying the current position or the like based on this dead reckoning positioning measurement on a map of the display 44 (step S54).

On the other hand, if the vehicle speed pulse drop is detected (step S52: YES), the error correction or compensation is applied with respect to the vehicle speed pulse drop. Concretely, the system controller 20 may perform a process of interpolating the missing vehicle speed pulse or pulses, and may apply the correction onto the velocity and the moving distance, on the basis of the vehicle speed pulse generated in the past or the future, for example. Then, a predetermined type of output is performed such as displaying the current position or the like obtained after this correction on a map of the display 44 (step S54).

Then, if an order to finish the navigation is not inputted (step S55: NO), the operational flow returns to the step S51 and the navigation operation is continued as usual.

On the other hand, if the order to finish the navigation is inputted (step S55: YES), a series of navigation operations are finished.

As described above, according to the fifth embodiment, when the vehicle speed pulse drop is generated, the correction or compensation for the vehicle speed pulse avoids the deterioration of the positioning accuracy of the finally obtained current position or the like. Thus, the high positioning accuracy can be finally obtained.

In the first to the fifth embodiments, as explained above, although the vehicle speed pulse drop is detected, in addition to or instead of this detection, it is possible to detect the excess generation of the vehicle speed pulse by the vehicle speed sensor 13 caused by racing or idling tire or the like. Namely, it is possible to detect the excess generation of the vehicle speed pulse according to the same theory as that of the first to the fifth embodiments by reversing the large and small relationship in comparing or setting the threshold values, when the velocity based on the vehicle speed pulse increases so rapidly that it cannot be accelerated in a real world on the basis of the vehicle weight, the engine output or the like, or when the velocity based on the vehicle speed pulse increases extremely as compared to the velocity based on the radio wave positioning data.

Figure 12:
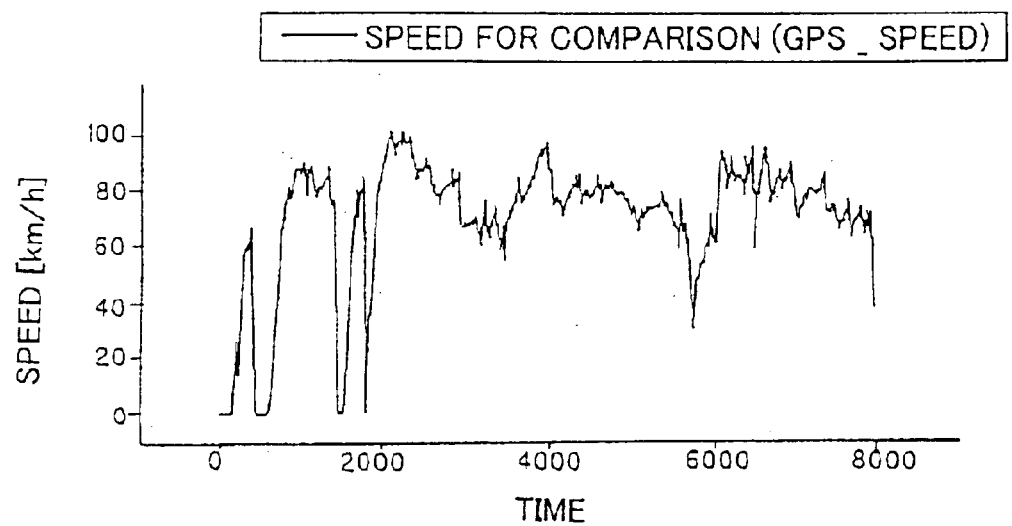
FIG. 12 is a characteristic diagram of the vehicle speed based only on the GPS with respect to a time axis in one drive condition of a vehicle.
Figure 13:
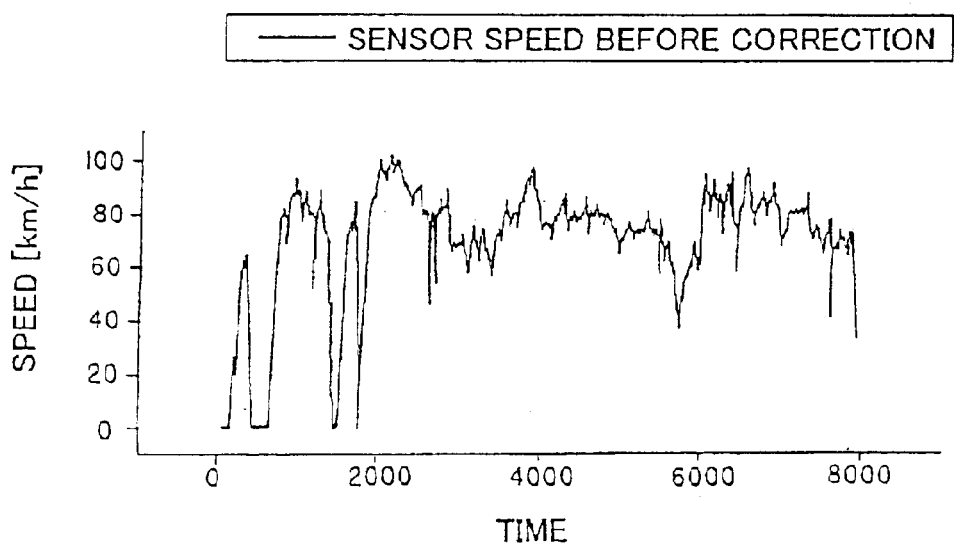
FIG. 13 is a characteristic diagram of the vehicle speed based only on the vehicle speed pulse with respect to a time axis in the same drive condition as that in FIG. 12.
Figure 14:
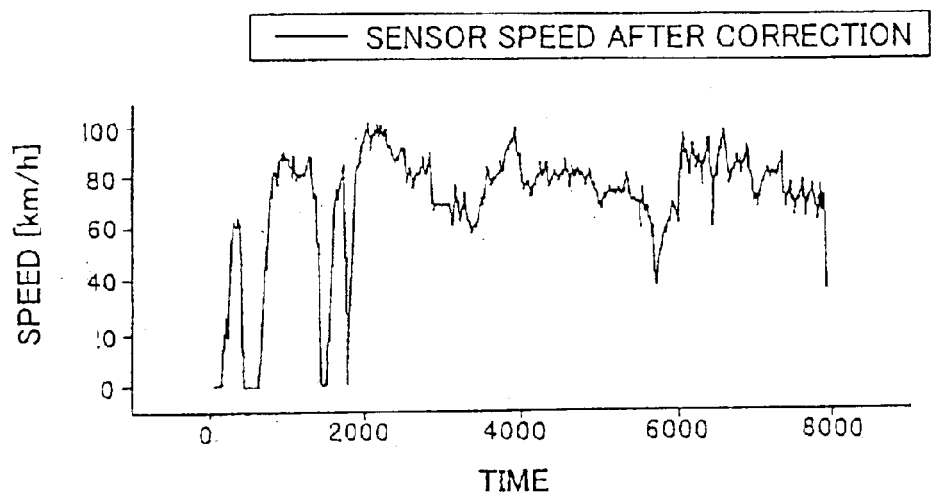
FIG. 14 is a characteristic diagram of the vehicle speed obtained as a result of applying a correction to the vehicle speed pulse when detecting the vehicle speed pulse drop of the embodiment, with respect to a time axis in the same drive condition as that in FIG. 12 and FIG. 13.
Figure 15:
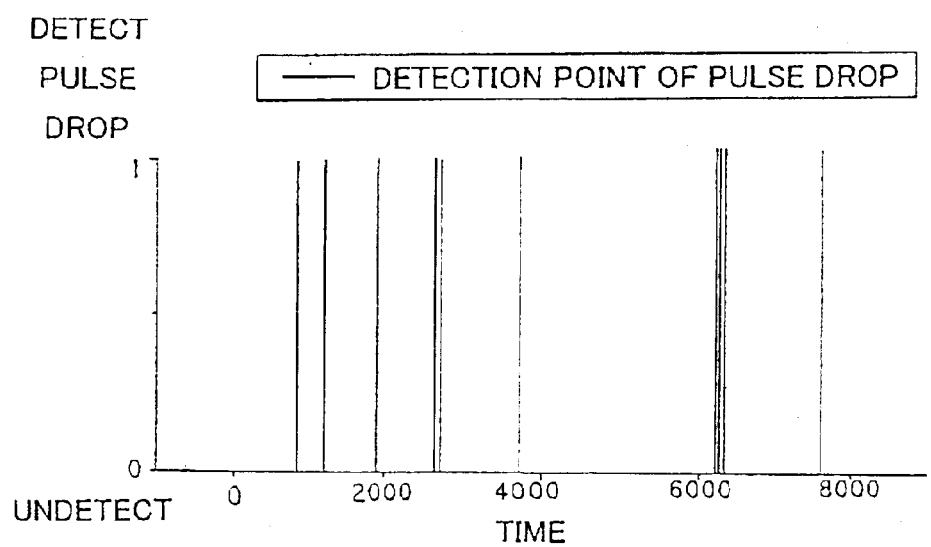
FIG. 15 is a characteristic diagram of a detection point of the vehicle speed pulse drop on the time axis in the embodiment.

Lastly, concrete examples of velocity after the error corrections or compensations by the first to the fifth embodiments as described above will be explained with reference to FIG. 12 to FIG. 15. Here, FIG. 12 is a characteristic diagram of the vehicle speed based only on the GPS with respect to the time axis in one drive condition of a vehicle. FIG. 13 is a characteristic diagram of the vehicle speed based only on the vehicle speed pulse with respect to the time axis in the same drive condition as that in FIG. 12. FIG. 14 is a characteristic diagram of the vehicle speed obtained as a result of applying the correction onto the vehicle speed upon detecting the vehicle speed pulse drop of the embodiment with respect to the time axis in the same drive condition as that in FIG. 12 and FIG. 13. FIG. 15 is a characteristic diagram of a detection point of the vehicle speed pulse drop of any one of the first to the fifth embodiments on the time axis.

In the vicinity of the detection point of the vehicle speed pulse drop shown in FIG. 15, there is a big noise on the vehicle speed, as shown in FIG. 13, because of an adverse effect of the vehicle speed pulse drop. Namely, it is considered that there is included a big error in the vehicle speed based on the vehicle speed pulse around this point. As a countermeasure to this, the vehicle speed pulse drop is detected and the appropriate error correction or compensation (wherein this error correction or compensation itself can be performed by any one of well-known methods of error-correcting or compensating the vehicle speed pulse) is applied. Therefore, the noise around the point of the vehicle speed pulse drop is drastically reduced, as shown in FIG. 14 and the vehicle speed closer to that based on the GPS (namely, the vehicle speed independent from the vehicle speed pulse drop) is obtained as shown in FIG. 12.

As understood from FIG. 12 and FIG. 15, it is possible to detect the vehicle speed pulse drop with a high accuracy in the on-vehicle navigation system using only the dead reckoning positioning or in combination with the dead reckoning positioning and the radio wave positioning, according to the present embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-136515 filed on May 7, 2001 including the specification, claims, drawings and summary is incorporated herein by reference in its entirety.

What is claimed is:

1. A method of detecting a vehicle speed pulse drop of a vehicle speed pulse in an on-vehicle navigation system, said system comprising a radio wave positioning apparatus and a vehicle speed sensor, by which the vehicle speed pulse is generated, for a dead reckoning positioning, said method comprising:
   a first calculation process of calculating a first physical quantity of a predetermined type from radio wave positioning data of the radio wave positioning apparatus;
   a second calculation process of calculating a second physical quantity of the predetermined type from the vehicle speed pulse; and
   a detection process of detecting the vehicle speed pulse drop by using a contradiction caused between the calculated first physical quantity and the calculated second physical quantity as a detection condition.

2. A method according to claim 1, wherein
   said first calculation process calculates a velocity as the first physical quantity,
   said second calculation process calculates a velocity as the second physical quantity, and
   said detection process uses such a condition that a difference between the velocity calculated by said first calculation process and the velocity calculated by said second calculation process is more than a predetermined threshold value, as one detection condition for the vehicle speed pulse drop.

3. A method according to claim 2, further comprising a third calculation process of calculating a velocity change amount from the radio wave positioning data and a fourth calculation process of calculating a velocity change amount from the vehicle speed pulse,
   wherein said detection process uses such a condition that the velocity change amount calculated by said third calculation process is less than a predetermined threshold value and the velocity change amount calculated by said fourth calculation process is more than a predetermined threshold value as another detection condition for the vehicle speed pulse drop.

4. A method of detecting a vehicle speed pulse drop of a vehicle speed pulse in an on-vehicle navigation system, said system comprising a vehicle speed sensor, by which the vehicle speed pulse is generated, for a dead reckoning positioning, said method comprising:
   a measurement process of measuring a pulse interval between the vehicle speed pulses generated by the vehicle speed sensor;
   a first hold process of at least temporarily holding a pulse interval measured for the n-th time (n is a natural number) by said measurement process; and
   a detection process of detecting the vehicle speed pulse drop by using such a condition that a ratio of a pulse interval measured for the (n+m)-th time (m is a natural number) with respect to the pulse interval held by said first hold process is more than a predetermined threshold value as a detection condition.

5. A method according to claim 4, further comprising a second hold process of at least temporarily holding the pulse interval measured for the (n+m)-th time,
   wherein said detection process uses such a condition that a ratio of the pulse interval held by said second hold process with respect to the pulse interval held by said first hold process is more than the predetermined threshold value as a detection condition.

6. A method according to claim 4, wherein the predetermined threshold value is a variable value or a fixed value which is set in advance.

7. A method of detecting a vehicle speed pulse drop of a vehicle speed pulse in an on-vehicle navigation system, said system comprising a vehicle speed sensor, by which the vehicle speed pulse is generated, for a dead reckoning positioning, said method comprising:
   a measurement process of measuring a pulse interval between the vehicle speed pulses generated by the vehicle speed sensor;
   a prediction process of predicting a generation time of the vehicle speed pulse, which is generated by the vehicle speed sensor and which defines an end of the pulse interval supposed to be measured for the (n+m)-th time (n and m are both natural numbers) by said measurement process, from the pulse interval measured for the n-th time by said measurement process; and a detection process of detecting the vehicle speed pulse drop, by using such a condition that the vehicle speed pulse is not generated by the vehicle speed pulse sensor even after it has elapsed the predicted generation time.

8. A method according to claim 7, further comprising a first hold process of at least temporarily holding the pulse interval measured for the n-th time, wherein said prediction process predicts the generation time from the pulse interval held by said first hold process.

9. A method according to claim 7, wherein said prediction process predicts the (n+m)-th pulse interval instead of predicting the generation time, and said detection process uses such a condition that a pulse interval shorter than the predicted pulse interval is not measured by said measurement process as the detection condition instead of using the condition that the vehicle speed pulse is not generated even after it has elapsed the predicted generation time.

10. A method according to claim 1, wherein said detection process detects an excess generation of the vehicle speed pulse by the vehicle speed sensor by using the contradiction as a detection condition.

11. A method according to claim 4, wherein said detection process detects the excess generation of the vehicle speed pulse by the vehicle speed sensor by using such a condition that a ratio of the pulse interval measured for the (n+m)-th time by said measurement process with respect to the pulse interval held by said first hold process is less than another threshold value as a detection condition.

12. A method according to claim 7, wherein said detection process detects the excess generation of the vehicle speed pulse by the vehicle speed sensor by using such a condition that the vehicle speed pulse is generated by the vehicle speed sensor before the predicted generation time as a detection condition.

13. An apparatus for detecting a vehicle speed pulse drop of a vehicle speed pulse in an on-vehicle navigation system, said system comprising a radio wave positioning apparatus and a vehicle speed sensor, by which the vehicle speed pulse is generated, for a dead reckoning positioning, said apparatus comprising:

a first calculation device for calculating a first physical quantity of a predetermined type from radio wave positioning data of the radio wave positioning apparatus;

a second calculation device for calculating a second physical quantity of the predetermined type from the vehicle speed pulse; and a detection device for detecting the vehicle speed pulse drop by using a contradiction caused between the calculated first physical quantity and the calculated second physical quantity as a detection condition.

14. An apparatus according to claim 13, wherein said first calculation device calculates a velocity as the first physical quantity, said second calculation device calculates a velocity as the second physical quantity, and said detection device uses such a condition that a difference between the velocity calculated by said first calculation device and the velocity calculated by said second calculation device is more than a predetermined threshold value as one detection condition for the vehicle speed pulse drop.

15. An apparatus according to claim 14, further comprising a third calculation device for calculating a velocity change amount from the radio wave positioning data and a fourth calculation device for calculating a velocity change amount from the vehicle speed pulse, wherein said detection device uses such a condition that the velocity change amount calculated by said third calculation device is less than a predetermined threshold value and the velocity change amount calculated by said fourth calculation device is more than a predetermined threshold value as another detection condition for the vehicle speed pulse drop.

16. An apparatus for detecting a vehicle speed pulse drop of a vehicle speed pulse in an on-vehicle navigation system, said system comprising a vehicle speed sensor, by which the vehicle speed pulse is generated, for a dead reckoning positioning, said apparatus comprising:

a measurement device for measuring a pulse interval between the vehicle speed pulses generated by the vehicle speed sensor;

a first hold device for at least temporarily holding a pulse interval measured for the n-th time (n is a natural number) by said measurement device; and a detection device for detecting the vehicle speed pulse drop by using such a condition that a ratio of a pulse interval measured for the (n+m)-th time (m is a natural number) with respect to the pulse interval held by said first hold device is more than a predetermined threshold value as a detection condition.

17. An apparatus for detecting a vehicle speed pulse drop of a vehicle speed pulse in an on-vehicle navigation system, said system comprising a vehicle speed sensor, by which the vehicle speed pulse is generated, for a dead reckoning positioning, said apparatus comprising:

a measurement device for measuring a pulse interval between the vehicle speed pulses generated by the vehicle speed sensor;

a prediction device for predicting a generation time of the vehicle speed pulse, which is generated by the vehicle speed sensor and which defines an end of the pulse interval supposed to be measured for the (n+m)-th time (n and m are both natural numbers) by said measurement device, from the pulse interval measured for the n-th time by said measurement device; and a detection device for detecting the vehicle speed pulse drop, by using such a condition that the vehicle speed pulse is not generated by the vehicle speed pulse sensor even after it has elapsed the predicted generation time.

18. An on-vehicle navigation system comprising:

an apparatus for detecting a vehicle speed pulse drop of a vehicle speed pulse in an on-vehicle navigation system, said system comprising a radio wave positioning apparatus and a vehicle speed sensor, by which the vehicle speed pulse is generated, for a dead reckoning positioning, said apparatus comprising: a first calculation device for calculating a first physical quantity of a predetermined type from radio wave positioning data of the radio wave positioning apparatus; a second calculation device for calculating a second physical quantity of the predetermined type from the vehicle speed pulse; and a detection device for detecting the vehicle speed pulse drop by using a contradiction caused between the calculated first physical quantity and the calculated second physical quantity as a detection condition;

the vehicle speed sensor;

a correction device for applying a correction onto the vehicle speed pulse when the vehicle speed pulse drop is detected by said apparatus for detecting the vehicle speed pulse drop; and a display device for displaying a current position based on the vehicle speed pulse.

19. An on-vehicle navigation system comprising:

an apparatus for detecting a vehicle speed pulse drop of a vehicle speed pulse in an on-vehicle navigation system, said system comprising a vehicle speed sensor, by which the vehicle speed pulse is generated, for a dead reckoning positioning, said apparatus comprising: a measurement device for measuring a pulse interval between the vehicle speed pulses generated by the vehicle speed sensor, a first hold device for at least temporarily holding a pulse interval measured for the n-th time (n is a natural number) by said measurement device; and a detection device for detecting the vehicle speed pulse drop by using such a condition that a ratio of a pulse interval measured for the (n+m)-th time (m is a natural number) with respect to the pulse interval held by said first hold device is more than a predetermined threshold value as a detection condition;

the vehicle speed sensor;

a correction device for applying a correction onto the vehicle speed pulse when the vehicle speed pulse drop is detected by said apparatus for detecting the vehicle speed pulse drop; and a display device for displaying a current position based on the vehicle speed pulse.

20. An on-vehicle navigation system comprising:

an apparatus for detecting a vehicle speed pulse drop of a vehicle speed pulse in an on-vehicle navigation system, said system comprising a vehicle speed sensor, by which the vehicle speed pulse is generated, for a dead reckoning positioning, said apparatus comprising: a measurement device for measuring a pulse interval between the vehicle speed pulses generated by the vehicle speed sensor; a prediction device for predicting a generation time of the vehicle speed pulse, which is generated by the vehicle speed sensor and which defines an end of the pulse interval supposed to be measured for the (n+m)-th time (n and m are both natural numbers) by said measurement device, from the pulse interval measured for the n-th time by said measurement device; and a detection device for detecting the vehicle speed pulse drop, by using such a condition that the vehicle speed pulse is not generated by the vehicle speed pulse sensor even after it has elapsed the predicted generation time;

the vehicle speed sensor;

a correction device for applying a correction onto the vehicle speed pulse when the vehicle speed pulse drop is detected by said apparatus for detecting the vehicle speed pulse drop; and a display device for displaying a current position based on the vehicle speed pulse.

21. An on-vehicle navigation system according to claim 18, further comprising a radio wave positioning apparatus for outputting radio wave positioning data, wherein said display device displays the current position based on the radio wave positioning data in addition to the vehicle speed pulse.

22. An on-vehicle navigation system according to claim 19, further comprising a radio wave positioning apparatus for outputting radio wave positioning data, wherein said display device displays the current position based on the radio wave positioning data in addition to the vehicle speed pulse.

23. An on-vehicle navigation system according to claim 20, further comprising a radio wave positioning apparatus for outputting radio wave positioning data, wherein said display device displays the current position based on the radio wave positioning data in addition to the vehicle speed pulse.

24. A program storage device readable by a computer for tangibly embodying a program of instructions executable by the computer to perform method processes of detecting a vehicle speed pulse drop of a vehicle speed pulse in an on-vehicle navigation system, said system comprising a radio wave positioning apparatus and a vehicle speed sensor, by which the vehicle speed pulse is generated, for a dead reckoning positioning, said method processes comprising:

a first calculation process of calculating a first physical quantity of a predetermined type from radio wave positioning data of the radio wave positioning apparatus;

a second calculation process of calculating a second physical quantity of the predetermined type from the vehicle speed pulse; and a detection process of detecting the vehicle speed pulse drop by using a contradiction caused between the calculated first physical quantity and the calculated second physical quantity as a detection condition.

25. A program storage device readable by a computer for tangibly embodying a program of instructions executable by the computer to perform method processes of detecting a vehicle speed pulse drop with reference to a vehicle speed pulse in an on-vehicle navigation system, said system comprising a vehicle speed sensor, by which the vehicle speed pulse is generated, for a dead reckoning positioning, said method processes comprising:

a measurement process of measuring a pulse interval between the vehicle speed pulses generated by the vehicle speed sensor, a first hold process of at least temporarily holding a pulse interval measured for the n-th time (n is a natural number) by said measurement process; and a detection process of detecting the vehicle speed pulse drop by using such a condition that a ratio of a pulse interval measured for the (n+m)-th time (m is a natural number) with respect to the pulse interval held by said first hold process is more than a predetermined threshold value as a detection condition.

26. A program storage device readable by a computer for tangibly embodying a program of instructions executable by the computer to perform method processes of detecting a vehicle speed pulse drop with reference to a vehicle speed pulse in an on-vehicle navigation system, said system comprising a vehicle speed sensor, by which the vehicle speed pulse is generated, for a dead reckoning positioning, said method processes comprising:

a measurement process of measuring a pulse interval between the vehicle speed pulses generated by the vehicle speed sensor;

a prediction process of predicting a generation time of the vehicle speed pulse, which is generated by the vehicle speed sensor and which defines an end of the pulse interval supposed to be measured for the (n+m)-th time (n and m are both natural numbers) by said measurement process, from the pulse interval measured for the n-th time by said measurement process; and a detection process of detecting the vehicle speed pulse drop, by using such a condition that the vehicle speed pulse is not generated by the vehicle speed pulse sensor even after it has elapsed the predicted generation time.

27. A computer data signal embodied in a carrier wave and representing a series of instructions which cause a computer to perform method processes of detecting a vehicle speed pulse drop with reference to a vehicle speed pulse in an on-vehicle navigation system, said system comprising a radio wave positioning apparatus and a vehicle speed sensor, by which the vehicle speed pulse is generated, for a dead reckoning positioning, said method processes comprising:

a first calculation process of calculating a first physical quantity of a predetermined type from radio wave positioning data of the radio wave positioning apparatus;

a second calculation process of calculating a second physical quantity of the predetermined type from the vehicle speed pulse; and a detection process of detecting the vehicle speed pulse drop by using a contradiction caused between the calculated first physical quantity and the calculated second physical quantity as a detection condition.

28. A computer data signal embodied in a carrier wave and representing a series of instructions which cause a computer to perform method processes for detecting a vehicle speed pulse drop with reference to a vehicle speed pulse in an on-vehicle navigation system, said system comprising a vehicle speed sensor, by which the vehicle speed pulse is generated, for a dead reckoning positioning, said method processes comprising:

a measurement process of measuring a pulse interval between the vehicle speed pulses generated by the vehicle speed sensor, a first hold process of at least temporarily holding a pulse interval measured for the n-th time (n is a natural number) by said measurement process; and a detection process of detecting the vehicle speed pulse drop by using such a condition that a ratio of a pulse interval measured for the (n+m)-th time (m is a natural number) with respect to the pulse interval held by said first hold process is more than a predetermined threshold value as a detection condition.

29. A computer data signal embodied in a carrier wave and representing a series of instructions which cause a computer to perform method processes for detecting a vehicle speed pulse drop with reference to a vehicle speed pulse in an on-vehicle navigation system, said system comprising a vehicle speed sensor, by which the vehicle speed pulse is generated, for a dead reckoning positioning, said method processes comprising:

a measurement process of measuring a pulse interval between the vehicle speed pulses generated by the vehicle speed sensor;

a predicting process of predicting a generation time of the vehicle speed pulse, which is generated by the vehicle speed sensor and which defines an end of the pulse interval supposed to be measured for the (n+m)-th time (n and m are both natural numbers) by said measurement process, from the pulse interval measured for the n-th time by said measurement process; and a detection process of detecting the vehicle speed pulse drop, by using such a condition that the vehicle speed pulse is not generated by the vehicle speed pulse sensor even after it has elapsed the predicted generation time.

* * * * *